US008180672B2

United States Patent
Curtis et al.

(10) Patent No.: US 8,180,672 B2
(45) Date of Patent: May 15, 2012

(54) SYSTEMS AND METHODS FOR PLACING ADVERTISEMENTS

(75) Inventors: Christian M. Curtis, Rockville, MD (US); Charles W. K. Gritton, Sterling, VA (US)

(73) Assignee: Hillcrest Laboratories, Inc., Rockville, MD (US)

( * ) Notice: Subject to any disclaimer, the term of this patent is extended or adjusted under 35 U.S.C. 154(b) by 1433 days.

(21) Appl. No.: 11/707,797

(22) Filed: Feb. 16, 2007

(65) Prior Publication Data

US 2007/0192794 A1    Aug. 16, 2007

Related U.S. Application Data

(60) Provisional application No. 60/774,861, filed on Feb. 16, 2006.

(51) Int. Cl.
*G06Q 30/00* (2012.01)
(52) U.S. Cl. ...................................................... 705/14.4
(58) Field of Classification Search ....................... 705/14
See application file for complete search history.

(56) References Cited

U.S. PATENT DOCUMENTS

| | | |
|---|---|---|
| 6,314,575 B1 | 11/2001 | Billock et al. |
| 6,412,110 B1 | 6/2002 | Schein et al. |
| 6,421,067 B1 | 7/2002 | Kamen et al. |
| 6,577,350 B1 | 6/2003 | Proehl et al. |
| 6,907,566 B1 * | 6/2005 | McElfresh et al. ........... 715/210 |
| 7,239,301 B2 | 7/2007 | Liberty et al. |
| 2002/0042738 A1 | 4/2002 | Srinivasan et al. |
| 2003/0014399 A1 * | 1/2003 | Hansen et al. .................... 707/3 |
| 2004/0039657 A1 | 2/2004 | Behrens et al. |
| 2004/0268393 A1 | 12/2004 | Hunleth et al. |
| 2005/0149395 A1 * | 7/2005 | Henkin et al. .................. 705/14 |
| 2005/0182792 A1 | 8/2005 | Israel et al. |
| 2005/0216516 A1 * | 9/2005 | Calistri-Yeh et al. ...... 707/104.1 |
| 2006/0020904 A1 * | 1/2006 | Aaltonen et al. .............. 715/850 |
| 2007/0073748 A1 * | 3/2007 | Barney .......................... 707/101 |
| 2007/0150348 A1 * | 6/2007 | Hussain et al. ................. 705/14 |
| 2007/0174255 A1 * | 7/2007 | Sravanapudi et al. ............ 707/3 |

OTHER PUBLICATIONS

International Search Report for PCT/US07/04519, mailed Sep. 25, 2007.
Written Opinion for PCT/US07/04519, mailed Sep. 25, 2007.

* cited by examiner

*Primary Examiner* — John Weiss
*Assistant Examiner* — Darnell Pouncil
(74) *Attorney, Agent, or Firm* — Potomac Patent Group PLLC

(57) ABSTRACT

Systems and methods provide techniques for associating advertisements with relevant content on a user interface. A method for placing advertisements on a user interface includes providing a user interface having a plurality of user interface screens, at least some of the plurality of user interface screens containing user-selectable control objects, and determining which of a plurality of advertisements to display on a user interface screen based on at least one of the following criteria: topical relevance, contextual relevance, path relevance and cognitive prominence.

14 Claims, 15 Drawing Sheets

1400

SYSTEMS AND METHODS FOR PLACING ADVERTISEMENTS

RELATED APPLICATIONS

This application is related to, and claims priority from, U.S. Provisional Patent Application Ser. No. 60/774,861, filed on Feb. 16, 2006, entitled "Systems and Methods for Placing Advertisements", the disclosure of which is incorporated here by reference.

BACKGROUND

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds and potentially thousands of channels of shows and information. Video-on-demand technology, currently used primarily in hotels and the like, provides the potential for in-home entertainment selection from among thousands of movie titles. Digital video recording (DVR) equipment such as offered by TiVo, Inc., 2160 Gold Street, Alviso, Calif. 95002, further expand the available choices.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface and control device options and framework for televisions has not changed much over the last 30 years. Printed guides are still the most prevalent mechanism for conveying programming information. The multiple button remote control with simple up and down arrows is still the most prevalent channel/content selection mechanism. The reaction of those who design and implement the TV user interface to the increase in available media content has been a straightforward extension of the existing selection procedures and interface objects. Thus, the number of rows and columns in the printed guides has been increased to accommodate more channels. The number of buttons on the remote control devices has been increased to support additional functionality and content handling, e.g., as shown in FIG. 1. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

In addition to increases in bandwidth and content, the user interface bottleneck problem is being exacerbated by the aggregation of technologies. Consumers are reacting positively to having the option of buying integrated systems rather than a number of segregable components. A good example of this trend is the combination television/VCR/DVD in which three previously independent components are frequently sold today as an integrated unit. This trend is likely to continue, potentially with an end result that most if not all of the communication devices currently found in the household being packaged as an integrated unit, e.g., a television/VCR/DVD/internet access/radio/stereo unit. Even those who buy separate components desire seamless control of and interworking between them. With this increased aggregation comes the potential for more complexity in the user interface. For example, when so-called "universal" remote units were introduced, e.g., to combine the functionality of TV remote units and VCR remote units, the number of buttons on these universal remote units was typically more than the number of buttons on either the TV remote unit or VCR remote unit individually. This added number of buttons and functionality makes it very difficult to control anything but the simplest aspects of a TV or VCR without hunting for exactly the right button on the remote. Many times, these universal remotes do not provide enough buttons to access many levels of control or features unique to certain TVs. In these cases, the original device remote unit is still needed, and the original hassle of handling multiple remotes remains due to user interface issues arising from the complexity of aggregation. Some remote units have addressed this problem by adding "soft" buttons that can be programmed with the expert commands. These soft buttons sometimes have accompanying LCD displays to indicate their action. These too have the flaw that they are difficult to use without looking away from the TV to the remote control. Yet another flaw in these remote units is the use of modes in an attempt to reduce the number of buttons. In these "moded" universal remote units, a special button exists to select whether the remote should communicate with the TV, DVD player, cable set-top box, VCR, etc. This causes many usability issues including sending commands to the wrong device, forcing the user to look at the remote to make sure that it is in the right mode, and it does not provide any simplification to the integration of multiple devices. The most advanced of these universal remote units provide some integration by allowing the user to program sequences of commands to multiple devices into the remote. This is such a difficult task that many users hire professional installers to program their universal remote units.

Some attempts have also been made to modernize the screen interface between end users and media systems. Electronic program guides (EPGs) have been developed and implemented to replace the afore-described media guides. Early EPGs provided what was essentially an electronic replica of the printed media guides. For example, cable service operators have provided analog EPGs wherein a dedicated channel displays a slowly scrolling grid of the channels and their associated programs over a certain time horizon, e.g., the next two hours. Scrolling through even one hundred channels in this way can be tedious and is not feasibly scalable to include significant additional content deployment, e.g., video-on-demand. More sophisticated digital EPGs have also been developed. In digital EPGs, program schedule information, and optionally applications/system software, is transmitted to dedicated EPG equipment, e.g., a digital set-top box (STB). Digital EPGs provide more flexibility in designing the user interface for media systems due to their ability to provide local interactivity and to interpose one or more interface layers between the user and the selection of the media items to be viewed. An example of such an interface can be found in U.S. Pat. No. 6,421,067 to Kamen et al., the disclosure of which is incorporated here by reference. FIG. 2 depicts a GUI described in the '067 patent. Therein, according to the Kamen et al. patent, a first column 190 lists program channels, a second column 191 depicts programs currently playing, a column 192 depicts programs playing in the next half-hour, and a fourth column 193 depicts programs playing in the half hour after that. The baseball bat icon 121 spans columns 191 and 192, thereby indicating that the baseball game is expected to continue into the time slot corresponding to column 192. However, text block 111 does not extend through into column 192. This indicates that the football game is not expected to extend into the time slot corresponding to column 192. As can be seen, a pictogram 194 indicates that after the football game, ABC will be showing a horse race. The icons shown in FIG. 2 can be actuated using a cursor, not shown, to implement various features, e.g., to download information associated with the selected programming. Other digital EPGs and related interfaces are described, for example, in U.S. Pat. Nos. 6,314,575, 6,412,110, and 6,577,350, the disclosures of which are also incorporated here by reference.

However, the interfaces described above suffer from, among other drawbacks, an inability to easily scale between large collections of media items and small collections of media items. For example, interfaces which rely on lists of items may work well for small collections of media items, but are tedious to browse for large collections of media items. Interfaces which rely on hierarchical navigation (e.g., tree structures) may be more speedy to traverse than list interfaces for large collections of media items, but are not readily adaptable to small collections of media items. Additionally, users tend to lose interest in selection processes wherein the user has to move through three or more layers in a tree structure. For all of these cases, current remote units make this selection processor even more tedious by forcing the user to repeatedly depress the up and down buttons to navigate the list or hierarchies. When selection skipping controls are available such as page up and page down, the user usually has to look at the remote to find these special buttons or be trained to know that they even exist.

Organizing frameworks, techniques and systems which simplify the control and screen interface between users and media systems as well as accelerate the selection process have been described in U.S. patent application Ser. No. 10/768,432, filed on Jan. 30, 2004, entitled "A Control Framework with a Zoomable Graphical User Interface for Organizing, Selecting and Launching Media Items", the disclosure of which is incorporated here by reference and which is hereafter referred to as the "'432 application". Such frameworks permit service providers to take advantage of the increases in available bandwidth to end user equipment by facilitating the supply of a large number of media items and new services to the user.

Advertising is ubiquitous in today's society. Thus, it may also be desirable to display advertisements in some or all of the user interface screens in such systems, which implies that some mechanism for determining which advertisements to display on which user interface screens is needed. One conventional way to determine ad placement is by way of keywords. For example, in Internet search engines a keyword is typed into a field and a search is generated. The search results have the keyword somewhere in each item. Advertisements related to those search results are also placed on the screen, e.g., along the right hand edge of the results screen. The selection and placement of these advertisements is performed based on the keyword(s) supplied to the search engine. To refine keyword searches, a user simply enters additional keywords until he or she gets the desired search findings, which additional keywords can also be used to determine a new list of advertisements to be displayed on the screen.

This can result in a wide variety of different advertisements appearing as a user goes through the search process, some of which may hold no interest for the user since they do not relate to the intended context of the user's initial search terms. For example, consider the word "Java". Using Java as the keyword in a search engine could return search results relating to a variety of topics such as Java (the island), Java (coffee) and Java (the programming language). This in turn could lead to a variety of advertisements related to any or all of the search findings. If the user was actually interested in vacation opportunities on Java the island, it could take a few iterations of keyword usage to get those results. Similarly, initial advertisements on the screen for Java programming books would not be of much interest to this user. Thus placing advertisements solely based on keywords may not always be the most efficient method of advertising user interfaces.

Accordingly the present invention addresses the need for a more effective method of placing advertisements on a user interface screen.

SUMMARY

Systems and methods according to these exemplary embodiments address this need and others by providing techniques for associating advertisements with relevant content on a user interface.

According to one exemplary embodiment, a method for placing advertisements on a user interface includes the steps of providing a user interface having a plurality of user interface screens, at least some of said plurality of user interface screens containing user-selectable control objects, and determining which of a plurality of advertisements to display on a user interface screen based on at least one of the following criteria: topical relevance, contextual relevance, path relevance and cognitive prominence.

According to another exemplary embodiment, a method for placing advertisements on a user interface includes the steps of providing a zoomable user interface having a plurality of user interface screens, at least some of the plurality of graphical user interface screens containing user-selectable objects associated with media selections, linking the user interface screens together by predetermined paths, wherein each of the plurality of user interface screens can be reached via a predetermined set of the paths, receiving user input resulting in zooming transitions from one of the plurality of graphical user interface screens to a currently displayed another of the graphical user interface screens, wherein a semantic context associated with reaching one of the currently displayed another of the plurality of user interface screens is determined based upon a particular path within the set of predetermined paths taken to reach said currently displayed another of said plurality of user interface screens, and placing at least one advertisement on the currently displayed another of the plurality of user interface screens based on the determined semantic context, wherein the semantic context is further determined based upon contextual relevance, the contextual relevance being calculated as:

$$HD(q, c) = \sum_{x \in \{P_q - P_c\}} \frac{\alpha}{r_x} + \sum_{y \in \{P_c - P_q\}} \frac{\beta}{r_y} + \sum_{z \in \{q, c\}} \frac{\gamma}{r_z}$$

where:
$\alpha$, $\beta$, and $\gamma$ are weighting factors,
$r_n$ is a hierarchical level of a given topic, and
$P_n$ is a set of parent topics of an item.

According to another exemplary embodiment, a user interface includes a zoomable user interface having a plurality of user interface screens, at least some of the plurality of user interface screens containing user-selectable objects associated with media selections, wherein the user interface screens are linked together by predetermined paths, wherein each of the plurality of user interface screens can be reached via a predetermined set of the paths, an interface for receiving user input resulting in zooming transitions from one of the plurality of user interface screens to a currently displayed another of the user interface screens, wherein a semantic context associated with reaching one of the currently displayed another of the plurality of user interface screens is determined based upon a particular path within the set of predetermined paths taken to reach the currently displayed another of the plurality of user interface screens, and at least one advertisement placed on the currently displayed another of the plurality of user interface screens, the at least one advertisement selected based on the determined semantic context, wherein the semantic context is further determined based upon contextual relevance, the contextual relevance being calculated as:

$$HD(q, c) = \sum_{x \in \{P_q - P_c\}} \frac{\alpha}{r_x} + \sum_{y \in \{P_c - P_q\}} \frac{\beta}{r_y} + \sum_{z \in \{q, c\}} \frac{\gamma}{r_z}$$

where:
$\alpha$, $\beta$, and $\gamma$ are weighting factors,
$r_n$ is a hierarchical level of a given topic, and
$P_n$ is a set of parent topics of an item.

According to yet another exemplary embodiment, a user interface includes a user interface having a plurality of user interface screens, at least some of the plurality of user interface screens containing user-selectable control objects, and at least one advertisement displayed on a currently displayed one of the plurality of user interface screens, wherein the at least one advertisement is selected from a plurality of advertisements to display on the currently displayed user interface screen based on at least one of the following criteria: topical relevance, contextual relevance, path relevance and cognitive prominence.

According to another exemplary embodiment, an advertisement selection method includes the steps of providing a plurality of advertisements, each of which have at least one keyword associated therewith selected from among a plurality of keywords, wherein each of the plurality of keywords have a hierarchical level associated therewith, providing a plurality of user interface screens, each of which have at least one of the plurality of keywords associated therewith, selecting at least one of the plurality of advertisements for placement on one of the plurality of user interface screens based on a calculation involving each of the at least one keywords associated, respectively, with the plurality of advertisements and the at least one of the plurality of keywords associated with the one of the plurality of user interface screens, wherein the calculation further involves at least one of the following criteria: topical relevance, contextual relevance, path relevance and cognitive prominence; and displaying the selected at least one of the plurality of advertisements on the one of the plurality of user interface screens.

BRIEF DESCRIPTION OF THE DRAWINGS

The accompanying drawings illustrate exemplary embodiments of the present invention, wherein.

DETAILED DESCRIPTION

Figure 1:
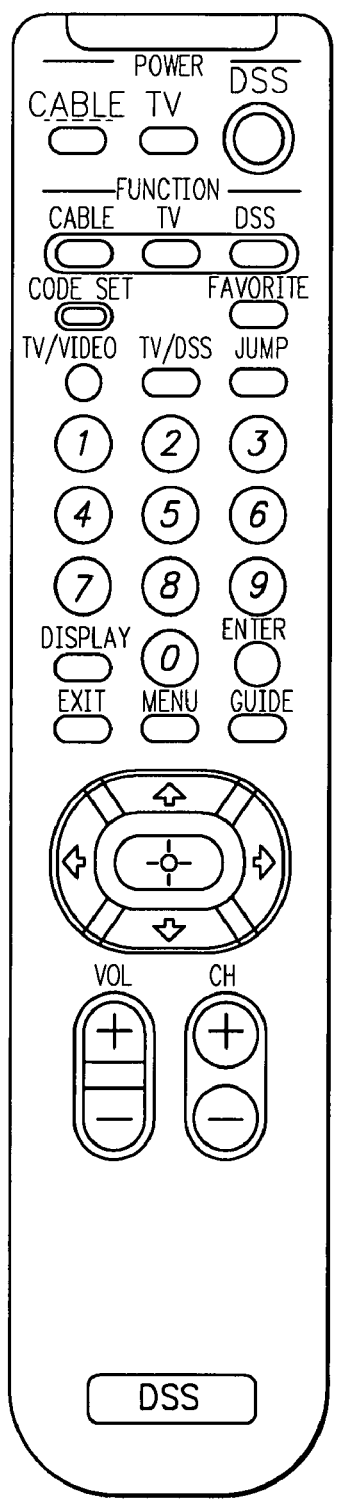
FIG. 1 depicts a conventional remote control unit for an entertainment system.
Figure 2:
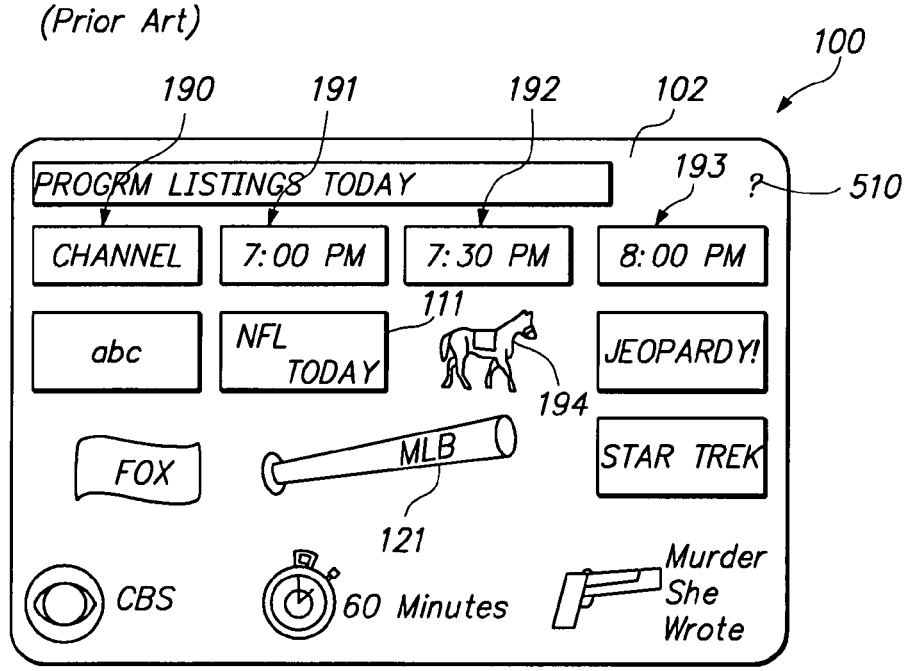
FIG. 2 depicts a conventional graphical user interface for an entertainment system.

The following detailed description of the invention refers to the accompanying drawings. The same reference numbers in different drawings identify the same or similar elements. Also, the following detailed description does not limit the invention. Instead, the scope of the invention is defined by the appended claims.

In order to provide some context for this discussion relative to the placement of advertisements in user interfaces, an exemplary aggregated media system 200 in which the present invention can be implemented will first be described with respect to FIG. 3. Those skilled in the art will appreciate, however, that the present invention is not restricted to implementation in this type of media system which is purely illustrative. Therein, an input/output (I/O) bus 210 connects the system components in the media system 200 together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 200 includes a television/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a media system remote control unit that supports free space pointing, has a minimal number of buttons to support navigation, and communicates with the entertainment system 200 through RF signals. For example, wireless I/O control device 226 can be a free-space pointing device which uses a gyroscope or other mechanism to define both a screen position and a motion vector to determine the particular command desired. A set of buttons can also be included on the wireless I/O device 226 to initiate the "click" primitive described below as well as a "back" button. In another exemplary embodiment, wireless I/O control device 226 is a media system remote control unit, which communicates with the components of the entertainment system 200 through IR signals. In yet another embodiment, wireless I/O control device 134 may be an IR remote control device similar in appearance to a typical entertainment system remote control with the added feature of a track-ball or other navigational mechanisms which allows a user to position a cursor on a display of the entertainment system 100.

The entertainment system 200 also includes a system controller 228. According to one exemplary embodiment of the present invention, the system controller 228 operates to store and display entertainment system data available from a plurality of entertainment system data sources and to control a wide variety of features associated with each of the system components. As shown in FIG. 3, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described below.

Figure 3:
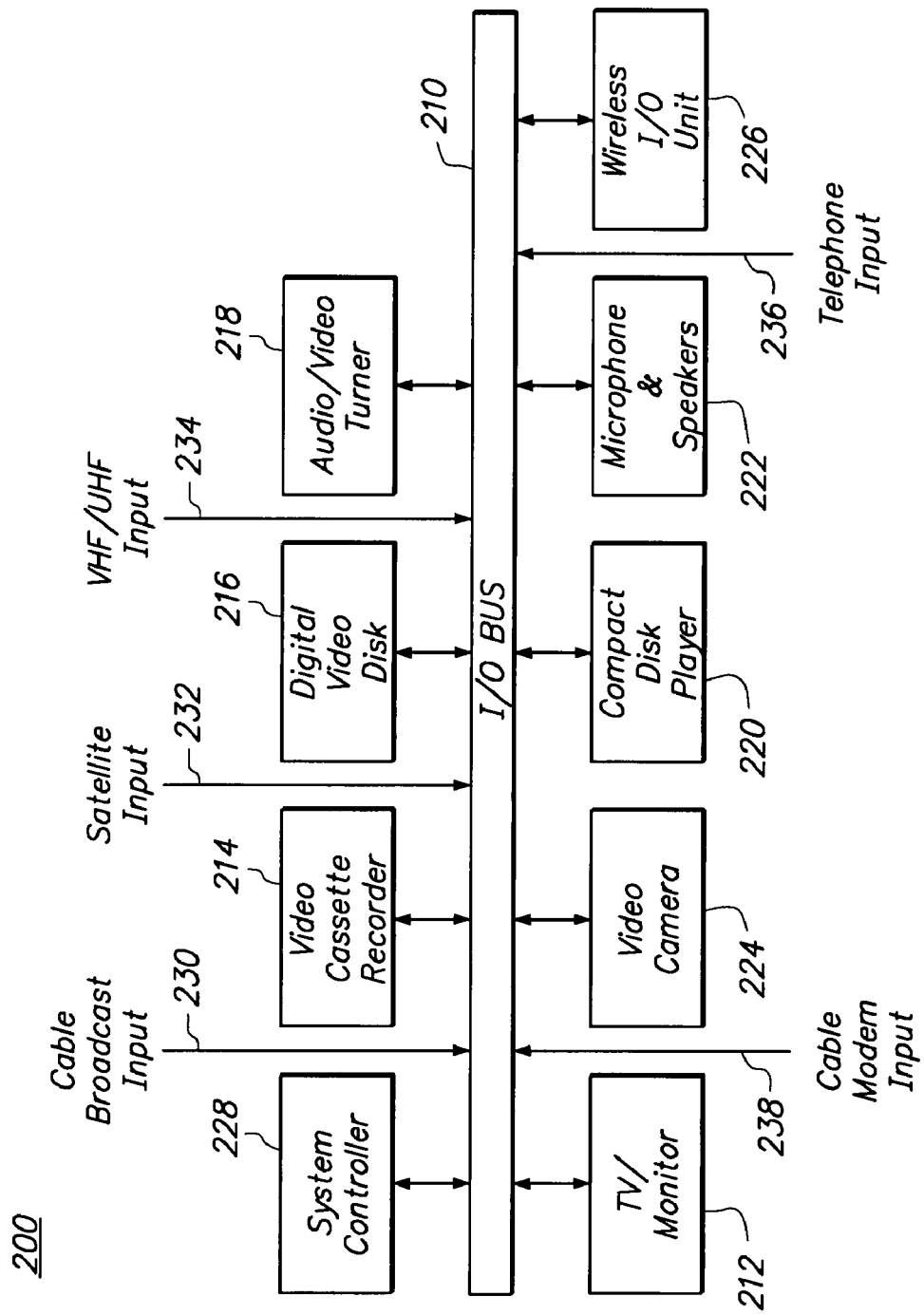
FIG. 3 depicts an exemplary media system in which exemplary embodiments of the present invention (both display and remote control) can be implemented.

As further illustrated in FIG. 3, media system 200 may be configured to receive media items from various media sources and service providers. In this exemplary embodiment, media system 200 receives media input from and, optionally, sends information to, any or all of the following sources: cable broadcast 230, satellite broadcast 232 (e.g., via a satellite dish), very high frequency (VHF) or ultra high frequency (UHF) radio frequency communication of the broadcast television networks 234 (e.g., via an aerial antenna), telephone network 236 and cable modem 238 (or another source of Internet content). Those skilled in the art will appreciate that the media components and media sources illustrated and described with respect to FIG. 3 are purely exemplary and that media system 200 may include more or fewer of both. For example, other types of inputs to the system include AM/FM radio and satellite radio.

Figure 4:
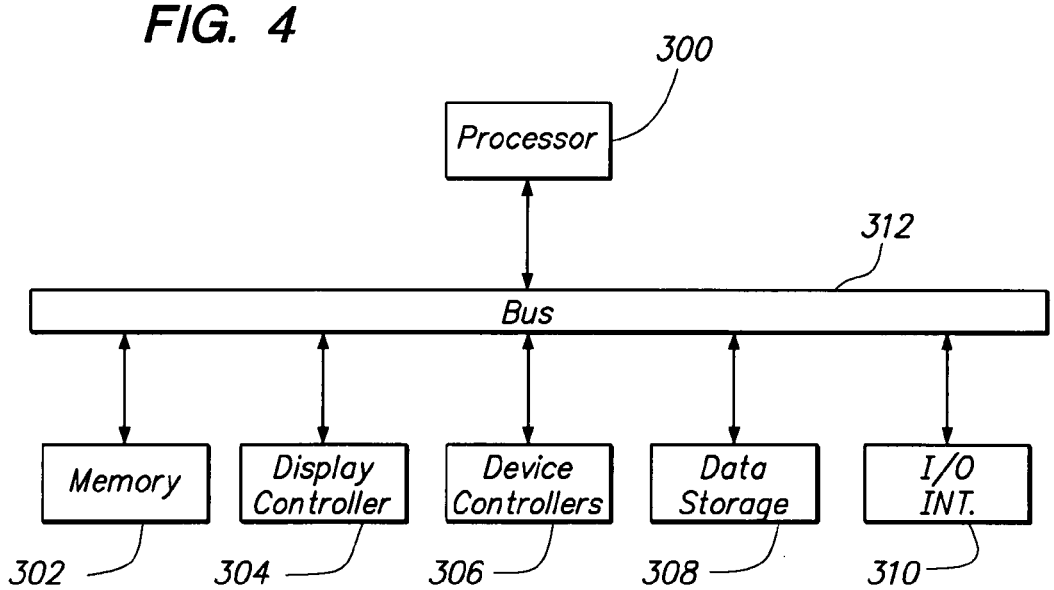
FIG. 4 shows a system controller of FIG. 3 in more detail.

FIG. 4 is a block diagram illustrating an embodiment of an exemplary system controller 228 according to the present invention. System controller 228 can, for example, be implemented as a set-top box and includes, for example, a processor 300, memory 302, a display controller 304, other device controllers (e.g., associated with the other components of system 200), one or more data storage devices 308 and an I/O interface 310. These components communicate with the processor 300 via bus 312. Those skilled in the art will appreciate that processor 300 can be implemented using one or more processing units. Memory device(s) 302 may include, for example, DRAM or SRAM, ROM, some of which may be designated as cache memory, which store software to be run by processor 300 and/or data usable by such programs, including software and/or data associated with the graphical user interfaces described below. Display controller 304 is operable by processor 300 to control the display of monitor 212 to, among other things, display GUI screens, advertisements and objects as described below. Zoomable GUIs according to exemplary embodiments of the present invention provide resolution independent zooming, so that monitor 212 can provide displays at any resolution. Device controllers 306 provide an interface between the other components of the media system 200 and the processor 300. Data storage 308 may include one or more of a hard disk drive, a floppy disk drive, a CD-ROM device, or other mass storage device. Input/output interface 310 may include one or more of a plurality of interfaces including, for example, a keyboard interface, an RF interface, an IR interface and a microphone/speech interface. According to one exemplary embodiment of the present invention, I/O interface 310 will include an interface for receiving location information associated with movement of a wireless pointing device.

Generation and control of a graphical user interface according to exemplary embodiments of the present invention to display media item selection information and advertisements are performed by the system controller 228 in response to the processor 300 executing sequences of instructions contained in the memory 302. Such instructions may be read into the memory 302 from other computer-readable mediums such as data storage device(s) 308 or from a computer connected externally to the media system 200. Execution of the sequences of instructions contained in the memory 302 causes the processor to generate graphical user interface objects and controls, among other things, on monitor 212. In alternative embodiments, hard-wire circuitry may be used in place of or in combination with software instructions to implement the present invention. As mentioned in the Background section, conventional interface frameworks associated with the television industry are severely limited in their ability to provide users with a simple and yet comprehensive selection experience. Accordingly, control frameworks described herein overcome these limitations and are, therefore, intended for use with televisions, albeit not exclusively. It is also anticipated that the revolutionary control frameworks, graphical user interfaces and/or various algorithms described herein will find applicability to interfaces which may be used with computers and other non-television devices. In order to distinguish these various applications of exemplary embodiments of the present invention, the terms "television" and "TV" are used in this specification to refer to a subset of display devices, whereas the terms "GUI", "GUI screen", "display" and "display screen" are intended to be generic and refer to television displays, computer displays and any other display device. More specifically, the terms "television" and "TV" are intended to refer to the subset of display devices which are able to display television signals (e.g., NTSC signals, PAL signals or SECAM signals) without using an adapter to translate television signals into another format (e.g., computer video formats). In addition, the terms "television" and "TV" refer to a subset of display devices that are generally viewed from a distance of several feet or more (e.g., sofa to a family room TV) whereas computer displays are generally viewed close-up (e.g., chair to a desktop monitor).

Having described an exemplary media system which can be used to implement control frameworks including zoomable graphical interfaces having advertisements places as described below under the heading "Advertisement Placement" according to the present invention, several examples of such interfaces will now be described. Those skilled in the art will, however, appreciate that layout techniques and mechanisms according to exemplary embodiments of the present invention are not limited to usage in a zoomable user interface and can also be applied to user interfaces which do not use zooming mechanisms. According to some exemplary embodiments of the present invention, a user interface displays selectable items which can be grouped by category. A user points a remote unit at the category or categories of interest and depresses the selection button to zoom in or the "back" button to zoom back. Each zoom in, or zoom back, action by a user results in a change in the magnification level and/or context of the selectable items rendered by the user interface on the screen as well as potential advertisements which will be further described below. According to exemplary embodiments, each change in magnification level can be consistent, i.e., the changes in magnification level are provided in predetermined steps. Exemplary embodiments of the present invention also provide for user interfaces which incorporate several visual techniques to achieve scaling to the very large. These techniques involve a combination of building blocks and techniques that achieve both scalability and ease-of-use, in particular techniques which supply an easy and fast selection experience regardless of the size(s) of the media item collection(s) being browsed.

The user interface is largely a visual experience. In such an environment exemplary embodiments of the present invention make use of the capability of the user to remember the location of objects within the visual environment. This is achieved by providing a stable, dependable location for user interface selection items, which is at the same time pleasing to the user and efficiently uses the allocated display space. Once the user has found an object of interest it is natural to remember which direction was taken to locate the object. If that object is of particular interest it is likely that the user will re-visit the item more than once, which will reinforce the user's memory of the path to the object. User interfaces according to exemplary embodiments of the present invention provide visual mnemonics that help the user remember the location of items of interest. Such visual mnemonics include pan and zoom animations, transition effects which generate a geographic sense of movement across the user interface's virtual surface and consistent zooming functionality, among other things which will become more apparent based on the examples described below.

Figure 5:
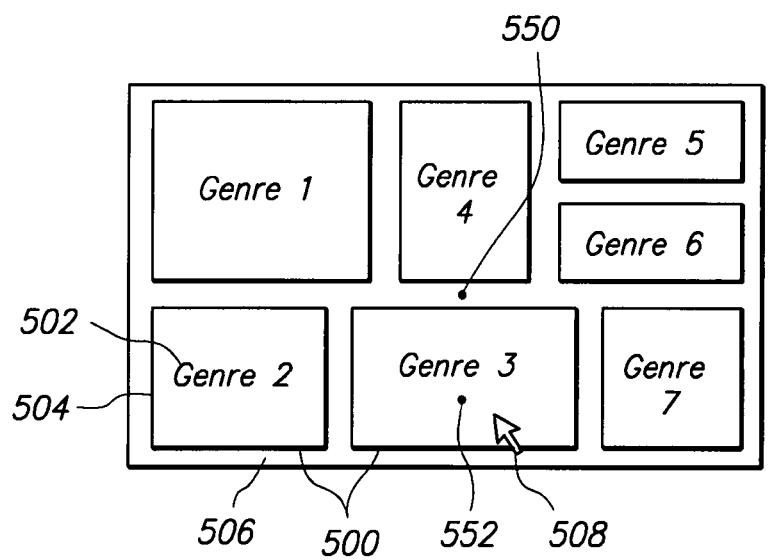
FIGS. 5-8 depict a graphical user interface for a media system according to an exemplary embodiment of the present invention.

Referring first to FIGS. 5-8, an exemplary control framework including a zoomable graphical user interface according to an exemplary embodiment of the present invention is described for use in displaying and selecting musical media items. FIG. 5 portrays the zoomable GUI at a high level e.g., a second "most zoomed out" state. Therein, the interface displays a set of shapes 500. Displayed within each shape 500 are text 502 and/or a picture 504 that describe the group of media item selections accessible via that portion of the GUI. As shown in FIG. 5, the shapes 500 are rectangles, and text 502 and/or picture 504 describe the genre of the media. However, those skilled in the art will appreciate that this first viewed GUI grouping could represent other aspects of the media selections available to the user e.g., artist, year produced, area of residence for the artist, length of the item, or any other characteristic of the selection. Also, the shapes used to outline the various groupings in the GUI need not be rectangles. Shrunk down versions of album covers and other icons could be used to provide further navigational hints to the user in lieu of or in addition to text 502 and/or picture 504 within the shape groupings 500. A background portion of the GUI 506 can be displayed as a solid color or be a part of a picture such as a map to aid the user in remembering the spatial location of genres so as to make future uses of the interface require less reading. The selection pointer (cursor) 508 follows the movements of an input device and indicates the location to zoom in on when the user presses the button on the device (not shown in FIG. 5).

According to one exemplary embodiment of the present invention, the input device can be a free space pointing device, e.g., the free space pointing device described in U.S. patent application Ser. No. 11/119,683, filed on May 2, 2005, entitled "Free Space Pointing Devices and Methods", the disclosure of which is incorporated here by reference and which is hereafter referred to as the "'683 application", coupled with a graphical user interface that supports the point, click, scroll, hover and zoom building blocks which are described in more detail below. One feature of this exemplary input device that is beneficial for use in conjunction with the present invention is that it can be implemented with only two buttons and a scroll wheel, i.e., three input actuation objects. One of the buttons can be configured as a ZOOM IN (select) button and one can be configured as a ZOOM OUT (back) button. Compared with the conventional remote control units, e.g., that shown in FIG. 1, the present invention simplifies this aspect of the GUI by greatly reducing the number of buttons, etc., that a user is confronted with in making his or her media item selection. An additional preferred, but not required, feature of input devices according to exemplary embodiments of the present invention is that they provide "free space pointing" capability for the user. The phrase "free space pointing" is used in this specification to refer to the ability of a user to freely move the input device in three (or more) dimensions in the air in front of the display screen and the corresponding ability of the user interface to translate those motions directly into movement of a cursor on the screen. Thus "free space pointing" differs from conventional computer mouse pointing techniques which use a surface other than the display screen, e.g., a desk surface or mousepad, as a proxy surface from which relative movement of the mouse is translated into cursor movement on the computer display screen. Use of free space pointing in control frameworks according to exemplary embodiments of the present invention further simplifies the user's selection experience, while at the same time providing an opportunity to introduce gestures as distinguishable inputs to the interface. A gesture can be considered as a recognizable pattern of movement over time which pattern can be translated into a GUI command, e.g., a function of movement in the x, y, z, yaw, pitch and roll dimensions or any subcombination thereof. Those skilled in the art will appreciate, however that any suitable input device can be used in conjunction with zoomable GUIs according to the present invention. Other examples of suitable input devices include, but are not limited to, trackballs, touchpads, conventional TV remote control devices, speech input, any devices which can communicate/translate a user's gestures into GUI commands, or any combination thereof. It is intended that each aspect of the GUI functionality described herein can be actuated in frameworks according to the present invention using at least one of a gesture and a speech command. Alternate implementations include using cursor and/or other remote control keys or even speech input to identify items for selection.

Figure 6:
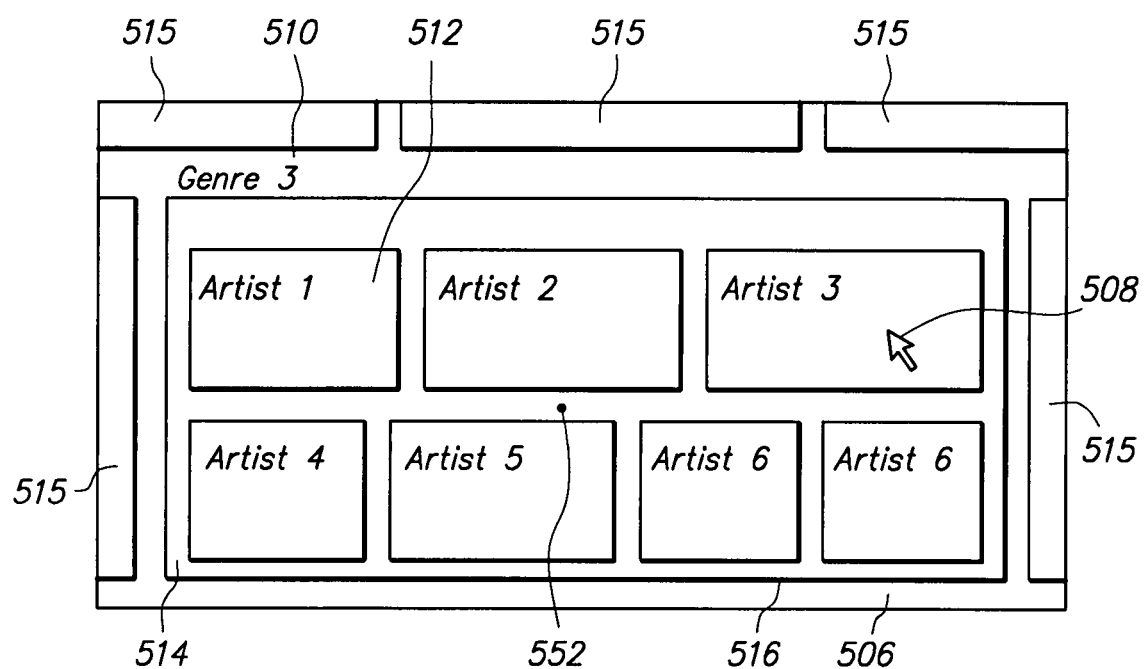

FIG. 6 shows a zoomed in view of Genre 3 that would be displayed if the user selects Genre 3 from FIG. 5, e.g., by moving the cursor 508 over the area encompassed by the rectangle surrounding Genre 3 on display 212 and depressing a button on the input device. The interface can animate the zoom from FIG. 5 to FIG. 6 so that it is clear to the user that a zoom occurred. An example of such an animated zoom/transition effect is described below. Once the shape 516 that contains Genre 3 occupies most of the screen on display 212, the interface reveals the artists that have albums in the genre. In this example, seven different artists and/or their works are displayed. The unselected genres 515 that were adjacent to Genre 3 in the zoomed out view of FIG. 5 are still adjacent to Genre 3 in the zoomed in view, but are clipped by the edge of the display 212. These unselected genres can be quickly navigated to by selection of them with selection pointer 508. It will be appreciated, however, that other exemplary embodiments of the present invention can omit clipping neighboring objects and, instead, present only the unclipped selections. Each of the artist groups, e.g., group 512, can contain images of shrunk album covers, a picture of the artist or customizable artwork by the user in the case that the category contains playlists created by the user.

Figure 7:
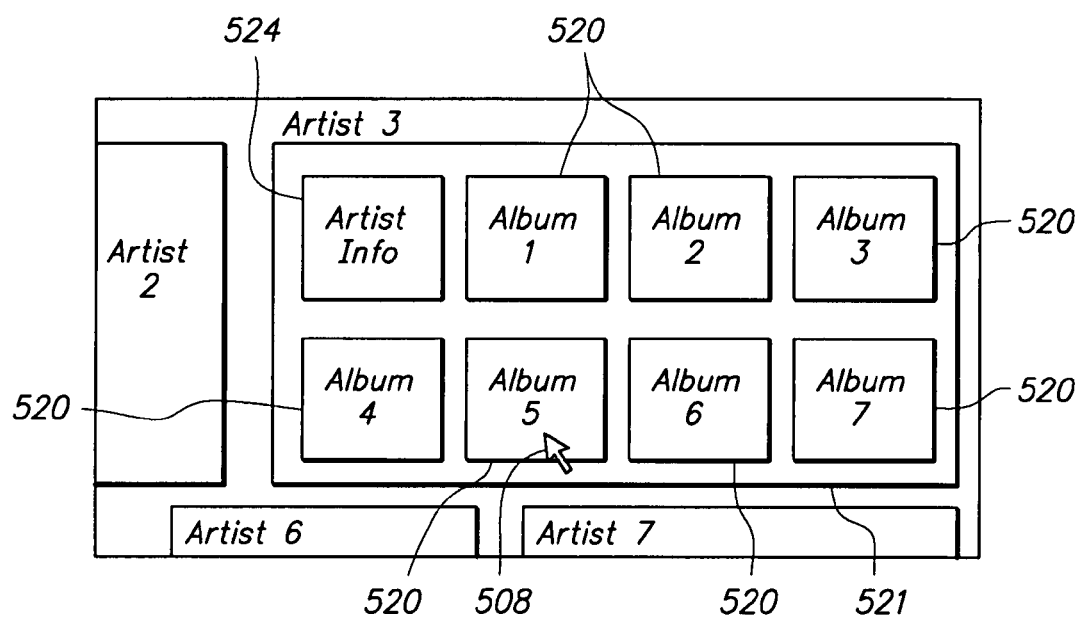

A user may then select one of the artist groups for further review and/or selection. FIG. 7 shows a further zoomed in view in response to a user selection of Artist 3 via positioning of cursor 508 and actuation of the input device, in which images of album covers 520 come into view. As with the transition from the GUI screen of FIG. 5 and FIG. 6, the unselected, adjacent artists (artists #2, 6 and 7 in this example) are shown towards the side of the zoomed in display, and the user can click on these with selection pointer 508 to pan to these artist views. In this portion of the interface, in addition to the images 520 of album covers, artist information 524 can be displayed as an item in the artist group. This information may contain, for example, the artist's picture, biography, trivia, discography, influences, links to web sites and other pertinent data. Each of the album images 520 can contain a picture of the album cover and, optionally, textual data. In the case that the album image 520 includes a user created playlist, the graphical user interface can display a picture which is selected automatically by the interface or preselected by the user.

Figure 8:
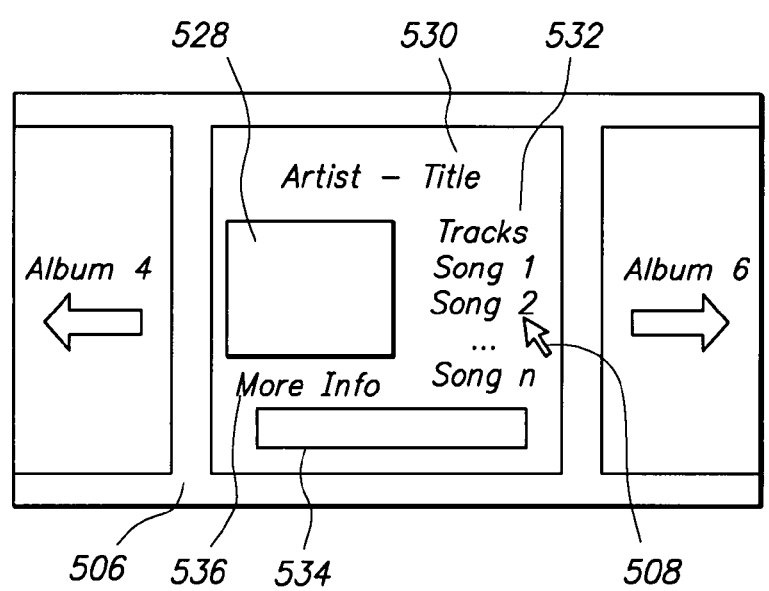
Figure 9:
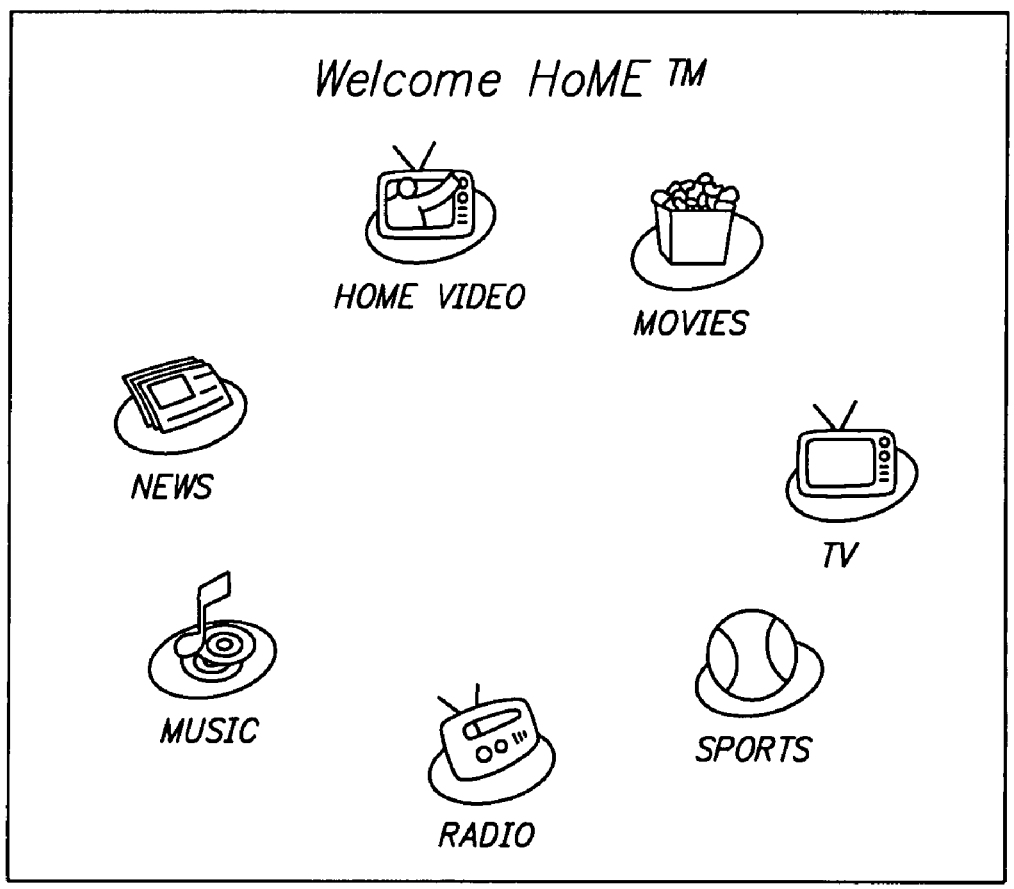
FIGS. 9-13 depict a zoomable graphical user interface according to another exemplary embodiment of the present invention.

Finally, when the user selects an album cover image 520 from within the group 521, the interface zooms into the album cover as shown in FIG. 8. As the zoom progresses, the album cover can fade or morph into a view that contains items such as the artist and title of the album 530, a list of tracks 532, further information about the album 536, a smaller version of the album cover 528, and controls 534 to play back the content, modify the categorization, link to the artists web page, or find any other information about the selection. Neighboring albums 538 are shown that can be selected using selection pointer 508 to cause the interface to bring them into view. As mentioned above, alternative embodiments of the present invention can, for example, zoom in to only display the selected object, e.g., album 5, and omit the clipped portions of the unselected objects, e.g., albums 4 and 6. This final zoom provides an example of semantic zooming, wherein certain GUI elements are revealed that were not previously visible at the previous zoom level. Various techniques for performing semantic zooming according to exemplary embodiments of the present invention are provided below.

As illustrated in the FIGS. 5-8 and the description, this exemplary embodiment of a graphical user interface provides for navigation of a music collection. Interfaces according to the present invention can also be used for video collections such as for DVDs, VHS tapes, other recorded media, video-on-demand, video segments and home movies. Other audio uses include navigation of radio shows, instructional tapes, historical archives, and sound clip collections. Print or text media such as news stories and electronic books can also be organized and accessed using this invention.

As will be apparent to those skilled in the art from the foregoing description, zoomable graphical user interfaces according to the present invention provide users with the capability to browse a large (or small) number of media items rapidly and easily. This capability is attributable to many characteristics of interfaces according to exemplary embodiments of the present invention including, but not limited to: (1) the use of images as all or part of the selection information for a particular media item, (2) the use of zooming to rapidly provide as much or as little information as a user needs to make a selection and (3) the use of several GUI techniques which combine to give the user the sense that the entire interface resides on a single plane, such that navigation of the GUI can be accomplished, and remembered, by way of the user's sense of direction. This latter aspect of GUIs according to the present invention can be accomplished by, among other things, linking the various GUI screens together "geographically" by maintaining as much GUI object continuity from one GUI screen to the next, e.g., by displaying edges of neighboring, unselected objects around the border of the current GUI screen. The zooming transition effect can be performed by progressive scaling and displaying of at least some of the UI objects displayed on the current UI view to provide a visual impression of movement of those UI objects toward or away from an observer. Alternatively, if a cleaner view is desired, and other GUI techniques provide sufficient geographic feedback, then the clipped objects can be omitted. As used in this text, the phrase "GUI screen" refers to a set of GUI objects rendered on one or more display units at the same time. A GUI screen may be rendered on the same display which outputs media items, or it may be rendered on a different display. The display can be a TV display, computer monitor or any other suitable GUI output device.

Another GUI effect which enhances the user's sense of GUI screen connectivity is the panning animation effect which is invoked when a zoom is performed or when the user selects an adjacent object at the same zoom level as the currently selected object. Returning to the example of FIG. 5, as the user is initially viewing this GUI screen, his or her point-of-view is centered about point 550. However, when he or she selects Genre 3 for zooming in, his or her point-of-view will shift to point 552. According to exemplary embodiments of the present invention, the zoom in process is animated to convey the shifting the POV center from point 550 to 552.

This panning animation can be provided for every GUI change, e.g., from a change in zoom level or a change from one object to another object on the same GUI zoom level. Thus if, for example, a user situated in the GUI screen of FIG. 6 selected the leftmost unselected genre 515 (Genre 2), a panning animation would occur which would give the user the visual impression of "moving" left or west. Exemplary embodiments of the present invention employ such techniques to provide a consistent sense of directional movement between GUI screens enables users to more rapidly navigate the GUI, both between zoom levels and between media items at the same zoom level.

Figure 10:
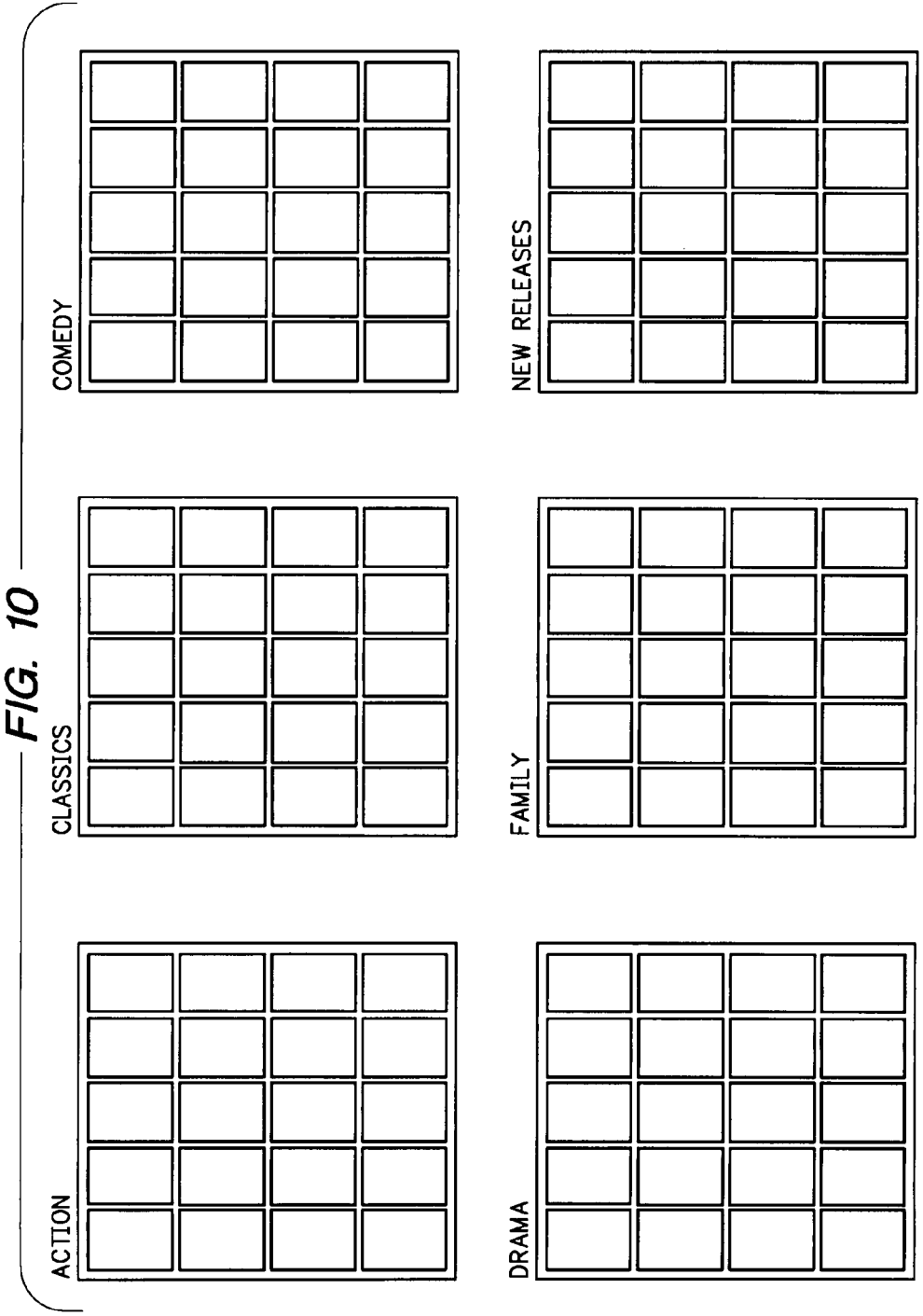

These capabilities of graphical user interfaces according to the present invention, as well as the usefulness of more sophisticated layouts and algorithms for generating such layouts, will become even more apparent upon review of another exemplary embodiment described below with respect to FIGS. 9-13. Therein, a startup GUI screen 1400 displays a plurality of organizing objects which operate as media group representations. The purely exemplary media group representations of home video, movies, TV, sports, radio, music and news could, of course include different, more or fewer media group representations. Upon actuation of one of these icons by a user, the GUI according to this exemplary embodiment will then display a plurality of images each grouped into a particular category or genre including advertisements that are relevant to the particular category or genre. For example, if the "movie" icon in FIG. 9 was actuated by a user, the GUI screen of FIG. 10 can then be displayed. Therein, a large number, e.g., 120 or more, selection objects are displayed. These selection objects can be categorized into particular group(s), e.g., action, classics, comedy, drama, family and new releases. Those skilled in the art will appreciate that more or fewer categories could be provided. In this exemplary embodiment, the media item images can be cover art associated with each movie selection. Although the size of the blocks in FIG. 10 is too small to permit detailed illustration of this relatively large group of selection item images, in implementation, the level of magnification of the images is such that the identity of the movie can be discerned by its associated image, even if some or all of the text may be too small to be easily read.

Figure 11:
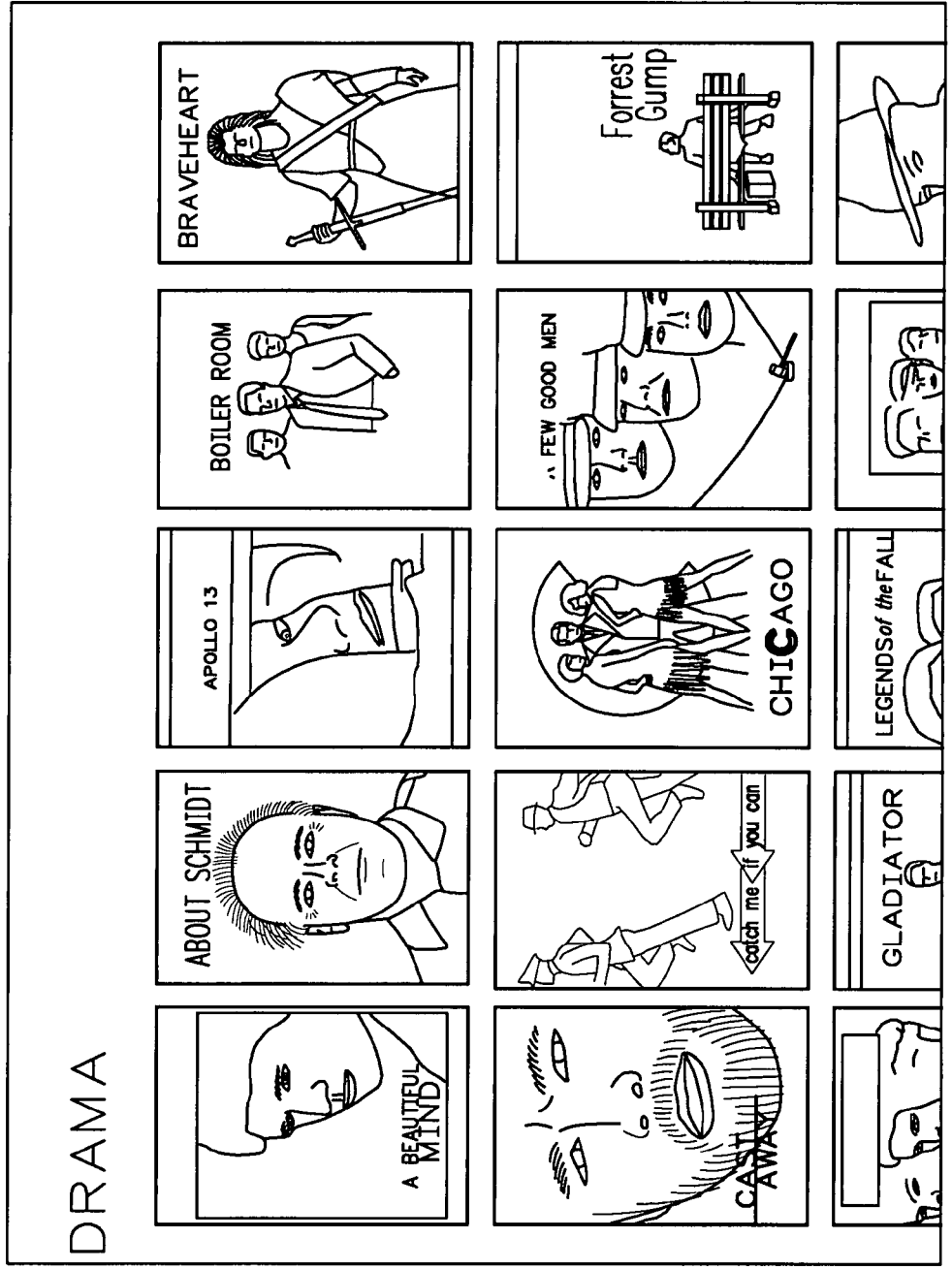
Figure 12:
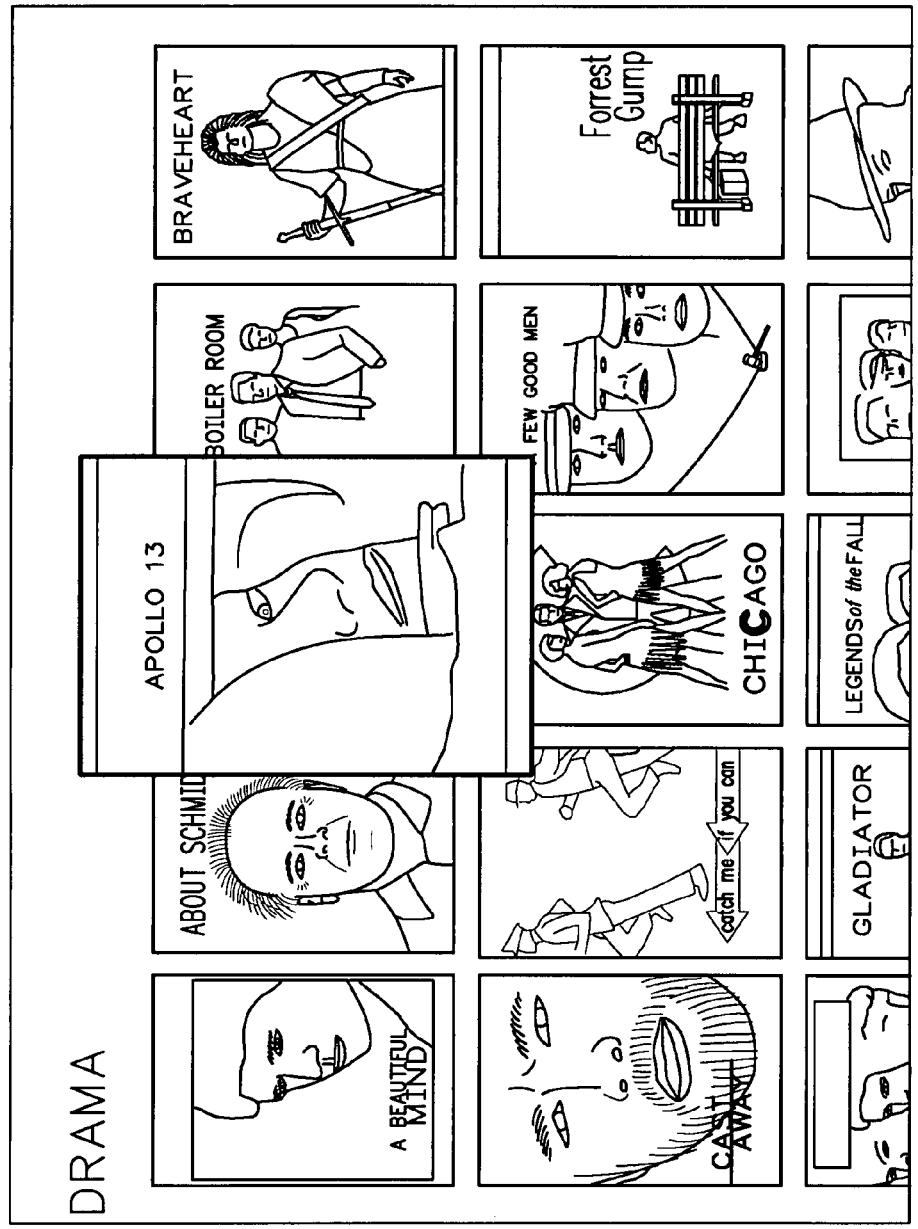
Figure 13:
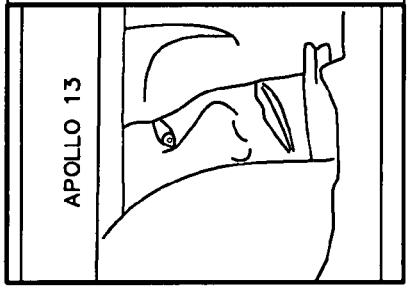

The cursor (not shown in FIG. 10) can then be disposed over a group of the movie images and the input device actuated to provide a selection indication for one of the groups. In this example the user selects the drama group and the graphical user interface then displays a zoomed version of the drama group of images as seen in FIG. 11. As with the previous embodiment, a transition effect can also be displayed as the GUI shifts from the GUI screen of FIG. 10 to the GUI screen of FIG. 11, e.g., the GUI may pan the view from the center of the GUI screen of FIG. 10 to the center of the drama group of images during or prior to the zoom. Note that although the zoomed version of the drama group of FIG. 11 only displays a subset of the total number of images in the drama group, that this zoomed version can alternatively contain all of the images in the selected group. The choice of whether or not to display all of the images in a selected group in any given zoomed in version of a GUI screen can be made based upon, for example, the number of media items in a group and a minimum desirable magnification level for a media item for a particular zoom level. This latter characteristic of GUIs according to the present invention can be predetermined by the system designer/service provider or can be user customizable via software settings in the GUI. For example, the number of media items in a group and the minimum and/or maximum magnification levels can be configurable by either or both of the service provider or the end user. Such features enable those users with, for example, poor eyesight, to increase the magnification level of media items being displayed. Conversely, users with especially keen eyesight may decrease the level of magnification, thereby increasing the number of media items displayed on a GUI screen at any one time and decrease browsing time.

One exemplary transition effect which can be employed in graphical user interfaces according to the present invention is referred to herein as the "shoe-to-detail" view effect. When actuated, this transition effect takes a zoomed out image and simultaneously shrinks and translates the zoomed out image into a smaller view, i.e., the next higher level of magnification. The transition from the magnification level used in the GUI screen of FIG. 10 to the greater magnification level used in the GUI screen of FIG. 11 results in additional details being revealed by the GUI for the images which are displayed in the zoomed in version of FIG. 11. The GUI selectively reveals or hides details at each zoom level based upon whether or not those details would display well at the currently selected zoom level. Unlike a camera zoom, which attempts to resolve details regardless of their visibility to the unaided eye, exemplary embodiments of the present invention provide for a configurable zoom level parameter that specifies a transition point between when to show the full image and when to show a version of the image with details that are withheld. The transition point can be based upon an internal resolution independent depiction of the image rather the resolution of TV/Monitor 212. In this way, GUIs according to the present invention are consistent regardless of the resolution of the display device being used in the media system.

In this exemplary embodiment, an additional amount of magnification for a particular image can be provided by passing the cursor over a particular image. This feature can be seen in FIG. 12, wherein the cursor has rolled over the image for the movie "Apollo 13". Although not depicted in FIG. 12, such additional magnification could, for example, make more legible the quote "Houston, we have a problem" which appears on the cover art of the associated media item as compared to the corresponding image in the GUI screen of FIG. 12 which is at a lower level of magnification. User selection of this image, e.g., by depressing a button on the input device, can result in a further zoom to display the details shown in FIG. 13. This provides yet another example of semantic zooming as it was previously described since various information and control elements are present in the GUI screen of FIG. 13 that were not available in the GUI screen of FIG. 12. For example, information about the movie "Apollo 13" including, among other things, the movie's runtime, price and actor information is shown. Those skilled in the art will appreciate that other types of information could be provided here. Additionally, this GUI screen includes GUI control objects including, for example, button control objects for buying the movie, watching a trailer or returning to the previous GUI screen (which could also be accomplished by depressing the ZOOM OUT button on the input device). Hyperlinks can also be used to allow the user to jump to, for example, GUI screens associated with the related movies identified in the lower right hand corner of the GUI screen of FIG. 13 or information associated with the actors in this movie. In this example, some or all of the film titles under the heading "Filmography" can be implemented as hyperlinks which, when actuated by the user via the input device, will cause the GUI to display a GUI screen corresponding to that of FIG. 13 for the indicated movie.

A transition effect can also be employed when a user actuates a hyperlink. Since the hyperlinks may be generated at very high magnification levels, simply jumping to the linked media item may cause the user to lose track of where he or she is in the media item selection "map". Accordingly, exemplary embodiments of the present invention provide a transition effect to aid in maintaining the user's sense of geographic position when a hyperlink is actuated. One exemplary transition effect which can be employed for this purpose is a hop transition. In an initial phase of the transition effect, the GUI zooms out and pans in the direction of the item pointed to by the hyperlink. Zooming out and panning continues until both the destination image and the origination image are viewable by the user. Using the example of FIG. 13 once again, if the user selects the hyperlink for "Saving Private Ryan", then the first phase of the hyperlink hop effect would include zooming out and panning toward the image of "Saving Private Ryan" until both the image for "Saving Private Ryan" and "Apollo 13" were visible to the user. At this point, the transition effect has provided the user with the visual impression of being moved upwardly in an arc toward the destination image. Once the destination image is in view, the second phase of the transition effect gives the user the visual impression of zooming in and panning to, e.g., on the other half of the arc, the destination image. The hop time, i.e., the amount of time both phases one and two of this transition effect are displayed, can be fixed as between any two hyperlinked image items. Alternatively, the hop time may vary, e.g., based on the distance traveled over the GUI. For example, the hop time can be parameterized as HopTime=A log(zoomed-in scale level/hop apex scale level)+B(distance between hyperlinked media items)+C, where A, B and C are suitably selected constant values.

Advertising Placement

Figure 14:
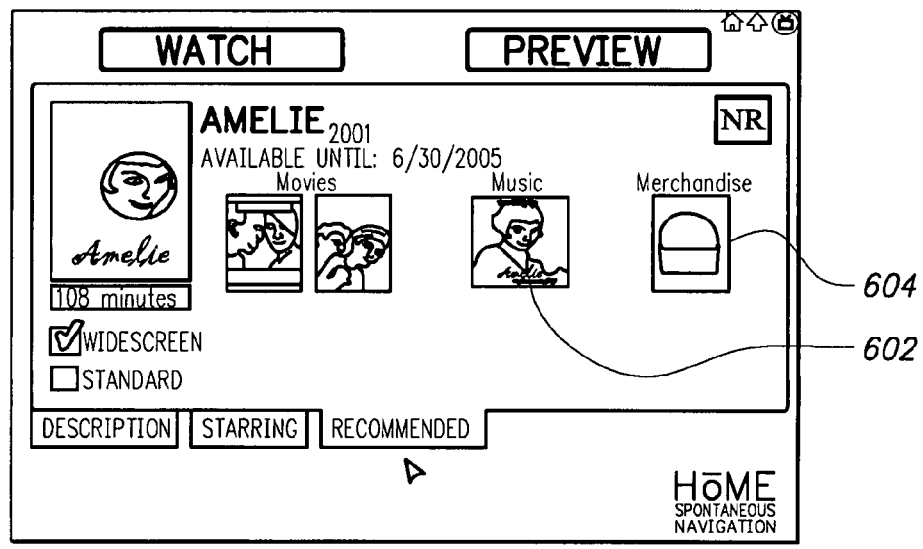
FIG. 14 shows advertisement options matched with a media selection according to an exemplary embodiment of the present invention.

Given the potentially huge amount of content to be accessed using the afore-described (and other) user interfaces and systems, and as mentioned above, it is foreseeable that some implementations will also enable content providers to display advertisements along with the selection items and other elements of the user interface. Purely as an illustrative example, consider the detailed item view of FIG. 14 associated with the movie "Amelie". Therein, to the right of the detailed information provided for that movie, a music advertisement 602 and a merchandise advertisement 604 are also displayed in that GUI screen by the user interface. The following exemplary embodiments of the present invention describe mechanisms for determining which advertisements to place in which GUI screens. Note that although these examples are provided in the context of the afore-described zoomable graphical user interfaces, they are not so limited and can be employed in any type of user interface.

Nonetheless, the aforementioned user GUIs of exemplary embodiments of the present invention have, among other things, the characteristic of known semantic context. Semantic context between media selection items is known by the system because, at any given snapshot of time, the system is considered to be a closed system, the metadata that accompanies media selections is known and the semantic relationship between the selectable media items and corresponding metadata is known. For example, if a user started a media selection process at a level in the user interface of all movies, then selected a subset of action movies, followed by a selected subset called Tom Cruise, then the results would show all action movies with Tom Cruise in them that were available in the system at the time of selection. The path taken to get to this level of display is known, as well as the accompanying metadata such as, title of each film, actors for each film and year film was made, which allows the semantic context to be known by the system. This knowledge of semantic relationships can be used, among other things, to determine which advertisement to provide on which GUI screens. Note, however, that this does not necessarily imply that the selectable media in these exemplary user interfaces is always static. In fact, metadata will be updated periodically which will drive changes in the user interface, however these changes will be known to the system a priori relative to the user accessing the system.

Given exemplary GUIs that have this characteristic of known semantic context, there are a number of specific advertisement placement criteria which can be used to determine which advertisements to place on which GUI screen. Advertisement placement is a collection of criteria and algorithms used to determine which advertisements are relevant to the current media selection and where to place the advertisements on a particular GUI screen.

Figure 15:
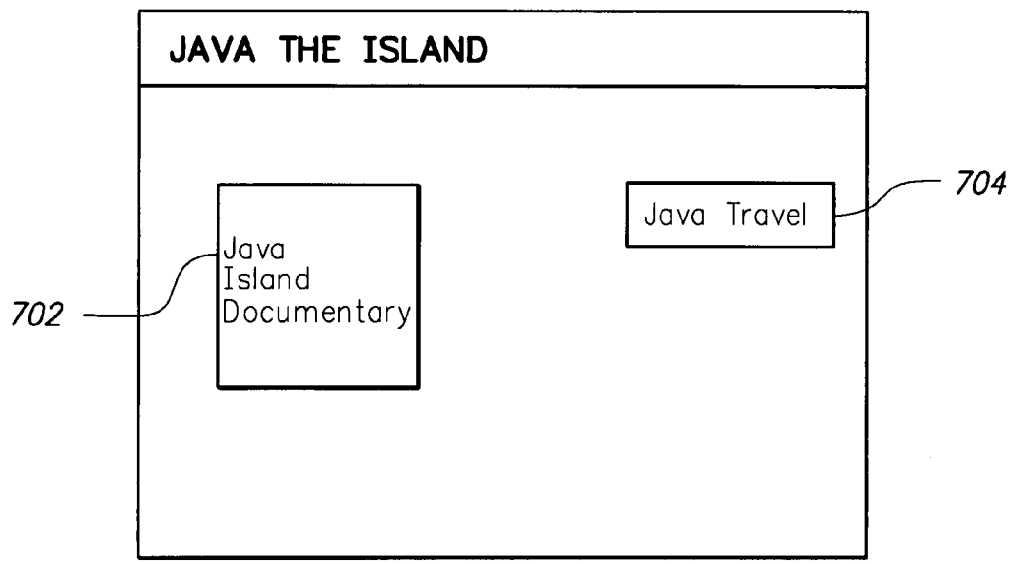
FIG. 15 shows an advertisement matched to a media selection based on topical relevance according to an exemplary embodiment of the present invention.

The first placement criterion is referred to herein as "topical relevance". Topical relevance describes how well the content of an advertisement is related to the topic or topics associated with currently displayed media options. Since semantic context knowledge is known by the system achieving a high level of topical relevance between advertisements and displayed user interface objects is possible. Topical relevance criteria can be used by exemplary embodiments of the present invention to remove the problem of semantic blurring of unrelated concepts that can occur from issues such as homonyms or acronyms. Additionally, topical relevance allows for direct linking of advertisements to a particular media selection or a specific search item. For example, as illustrated in FIG. 15, using the Java example from the Background section of this application, when a user navigates to a screen which displays a movie cover for a Java Island Documentary 702 (or any other correctly related media not shown), advertisement placement algorithms according to exemplary embodiments of the present invention might place an advertisement for Java travel 704 on the same GUI screen because the system knows that the user is not currently interested in Java the programming language or coffee.

Topical relevance criteria can also be used when an advertiser does not want their advertisements to be linked to certain topics. For example if car manufacturer A wanted their advertisements to be linked to racecar events but not to racecar events involving car manufacturer B's products, topical relevance criteria can be employed to provide appropriate advertisement placement.

Figure 16:
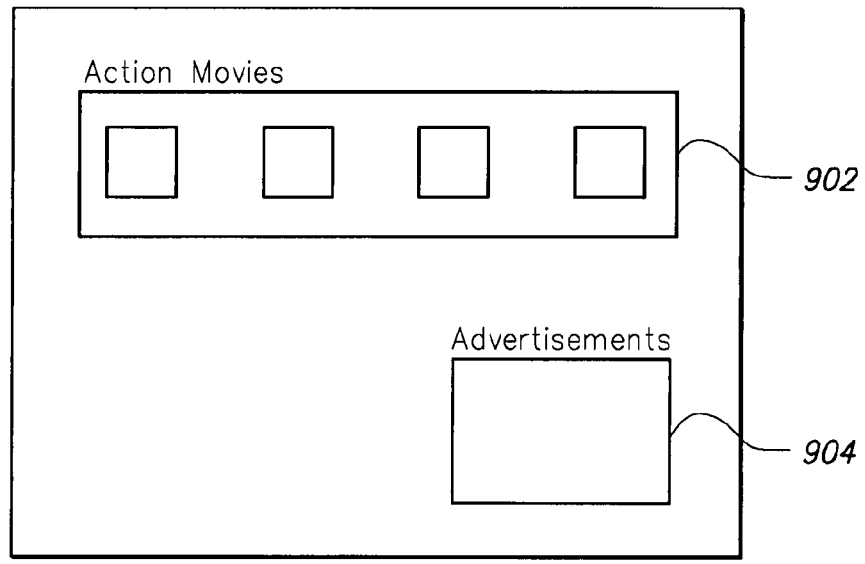
FIG. 16 shows an advertisement matched to a group of media selections based on conceptual context relevance according to an exemplary embodiment of the present invention.

The second placement criterion which can be used to drive advertising placement according to exemplary embodiments of the present invention is referred to herein as "conceptual context relevance". Conceptual context relevance criteria describe the theme of a particular GUI screen. The theme of the GUI screen is then used in the algorithm for determining relevant advertisements to be displayed. For example, as illustrated in FIG. 16, a bookshelf of action movies 902 is displayed in this GUI screen. From this theme of action movies, advertisements 904 deemed to be relevant based on conceptual context relevance could be displayed, e.g., advertisements for sports cars or hunting equipment. Based upon user choices and the system's ability to know information such as title, actor or content of displayed media items, a variety of themes are possible. A subset of conceptual context relevance is neighbor relevance. Neighbor relevance describes the relationship between different media items on a page or GUI screen.

The third placement criterion is referred to herein as "path relevance". Path relevance uses the information gathered about the path taken while moving through various screens of the GUI combined with the closed system knowledge that there are a finite (but potentially large) number of paths between items in the algorithm for determining relevant advertisements to be displayed. Consider again, for example, the GUI screen illustrated in FIG. 13 for the movie "Apollo 13". As described above, one exemplary path to reach this screen involved first navigating to a GUI screen for all movies (FIG. 10), then navigating to a screen which focused on movies classified as dramas (FIG. 11), and finally clicking on the Apollo 13 movie cover to reach the detailed GUI screen shown in FIG. 13. However the user could have reached this same GUI screen by taking other paths through the user interface. For example, the user could have been previously looking at a detailed GUI screen for the movie "Forrest Gump" and reached the screen in FIG. 13 by clicking on a hyperlink to "Apollo 13". Advertising placement algorithms (described below) can use this path information to determine which ads to place on the screen. In the foregoing example, an advertisement placement algorithm could place a first set of ads on the screen based on the first path to reach the screen of FIG. 13 and a second, different set of ads on the screen based on taking the second path to reach the screen of FIG. 13.

Figure 17:
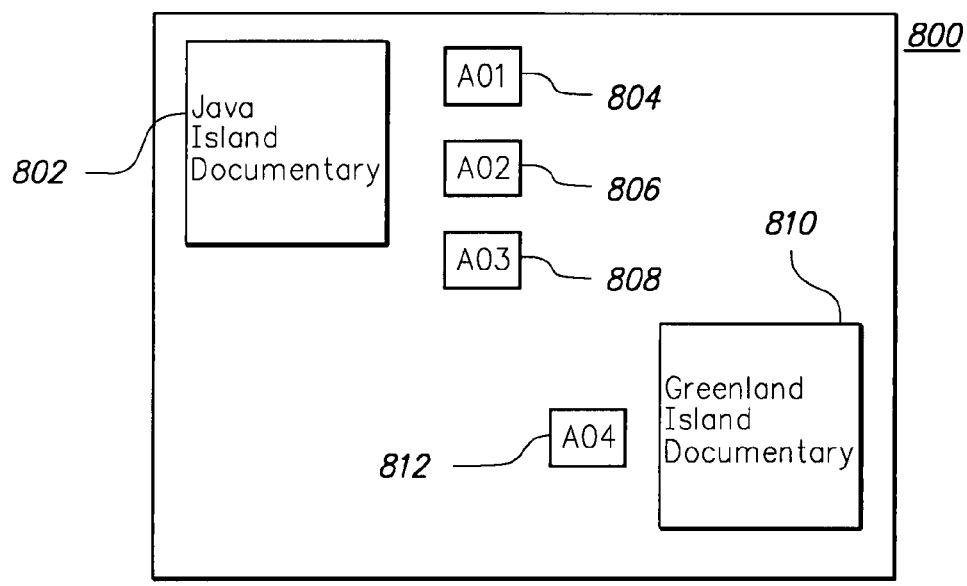
FIG. 17 shows advertisement and media item placement based on cognitive prominence according to an exemplary embodiment of the present invention.

The fourth placement criterion is referred to herein as "cognitive prominence". Cognitive prominence divides a screen into zones with the knowledge that certain zones are known to be more frequently noticed or seen. This concept allows ad placement to be weighted relative to portions of a screen. For example, consider the screen view 800 of FIG. 17. In this screen view 800 there are two media selections and four advertisements. The Java island documentary has more advertisements, ad1 804, ad2 806 and ad3 808 linked to it as compared to Greenland island documentary 810 which has one advertisement linked to it. Since the Java island documentary 802 has more advertisements linked to it, the Java island documentary 802 is placed in a more frequently seen zone of the screen view 800, e.g., the upper left-hand portion of the GUI screen, than Greenland island documentary 810, which is placed in the lower right-hand portion.

According to exemplary embodiments of the present invention each of the criteria described above can be defined algorithmically to enable dynamic advertising placement in software. For example, as described above topical relevance describes how well the content of an advertisement is related to the currently displayed media option and can be considered to be a measure of how specific an advertisement is to the currently selected media item. More specifically topical relevance can be expressed as the distance any given advertisement specification "a" has from the "n" topic(s) "$t_p$" on page "p" as follows:

$$\mu_T(a, p) = \sum_{i=0}^{n} \frac{\delta(a \cap t_i)}{\delta(a) + \delta(t_i)} \quad (1)$$

where δ is the distance of a topic point from the root node. Additionally, equation (1) can be extended to weight multiple advertisement specifications.

Figure 18:
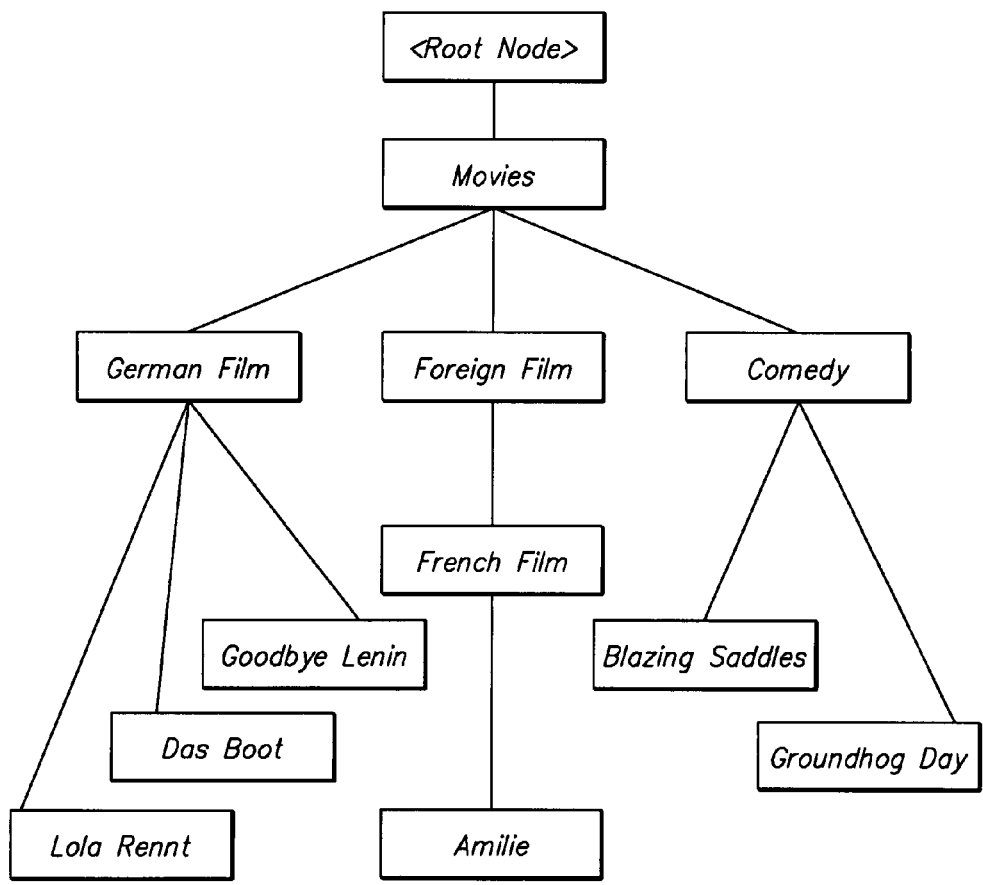
FIG. 18 illustrates a hierarchy used to describe a topical relevance criteria for advertisement placement according to an exemplary embodiment of the present invention.

To provide an illustrative example regarding the application of equation (1) in an exemplary user interface, consider the exemplary, hierarchical network of keywords shown in FIG. 18. Therein, the hierarchical network refers to several movies on an exemplary user interface "bookshelf" screen which, for example, shows the six movies listed at the bottom of FIG. 18 as user-selectable DVD movie cover icons on a screen that looks like that of FIG. 12. Although FIG. 12 does not show any advertisements, suppose that one advertisement is to be placed on the screen to the right or left of the bookshelf of movies. Further suppose that the system currently includes three advertisements from which the selection can be made, one with the keyword "German Film", one with the keyword "Comedy", and one with the keyword "Amelie". The following illustrates how equation (1) can be used to make the selection based on the context of the six movies displayed on the user interface screen.

Given a set of advertisements $a_i \in A$ Aavailable for placement on page p, select i to maximize $\mu_T(keyword(a_i),p)$.
Given p={Amelie, Lola Re nnt, DasBoot, GoodbyeLenin, BlazingSaddles, GroundhogDay}, $\mu_T$ of equation (1) can be computed as follows:
1) For keyword($a_i$)=GermanFilm, first find the least common ancestor node:
$a \cap t_0$=ForeignFilm(δ=2)
$a \cap t_1$=GermanFilm(δ=3)
$a \cap t_2$=GermanFilm(δ=3)
$a \cap t_3$=GermanFilm(δ=3)
$a \cap t_4$=Movies(δ=1)
$a \cap t_5$=Movies(δ=1)
This gives:

$$\mu_T = \sum \left( \frac{2}{3+4} + \frac{3}{3+4} + \frac{3}{3+4} + \frac{3}{3+4} + \frac{1}{3+4} + \frac{1}{3+4} \right)$$
$$= 1.857$$

2) For $keyword(a_i)=Comedy$, we proceed similarly with the result:

$$\mu_T = \sum \left( \frac{1}{2+4} + \frac{1}{2+4} + \frac{1}{2+4} + \frac{1}{2+4} + \frac{2}{2+4} + \frac{2}{2+4} \right)$$
$$= 1.333$$

3) For $keyword(a_i)=Amelie$, the metric is:

$$\mu_T = \sum \left( \frac{4}{4+4} + \frac{2}{4+4} + \frac{2}{4+4} + \frac{2}{4+4} + \frac{1}{4+4} + \frac{1}{4+4} \right)$$
$$= 1.500$$

So, in the foregoing example, the selected ad would be the one tagged "German Film", because it is the most "relevant" to the context of the page. Note that this tracks with an intuitive understanding of the selection problem—although there is an ad specifically tagged "Amelie", and the film Amelie appears on the page, it is clear that (since half the six films on the page are German) that the "German Film" ad is the most topically relevant. That is to say, this page is most "about" German Film.

Figure 19:
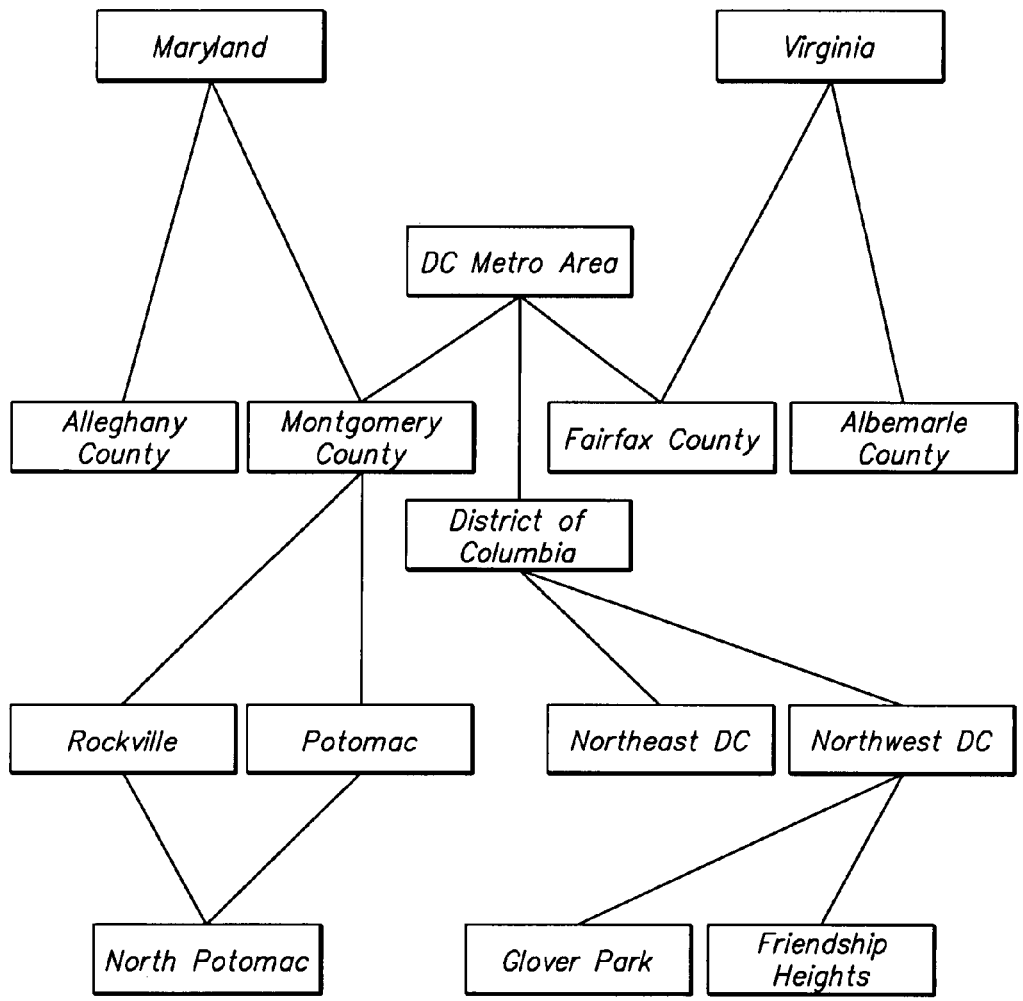
FIG. 19 illustrates a hierarchy used to describe a contextual relevance criteria for advertisement placement according to an exemplary embodiment of the present invention.

Conceptual context relevance describes the theme of the entire screen and can be considered to be a measure of how specific an advertisement is to the current theme. A cartography analogy serves to illustrate the type of measure provided by the conceptual context relevance parameter. Consider that Rockville and Gaithersburg are part of Montgomery County, which is part of Maryland, which is part of the United States. Businesses located in Rockville are "close to" businesses located in Gaithersburg. Businesses located in Rockville are also "close to" businesses in Montgomery County, but potentially not as close. North Potomac, as an informal descriptor, can be viewed as being part of both Potomac and Rockville, but is more specific than either. The underlying idea is that there are positional descriptors (in geographic space) that have differing levels of specificity, and more particularly that can overlap. FIG. 19 illustrates an expanded version of this analogy with four levels in the hierarchy.

Translating this type of relationship into a contextual relevance parameter for advertising placement, this exemplary embodiment maps an advertising domain onto that space and derives a compound metric for the hierarchical distance between any two items q and c as:

$$HD(q, c) = \sum_{x \in \{P_q - P_c\}} \frac{\alpha}{r_x} + \sum_{y \in \{P_c - P_q\}} \frac{\beta}{r_y} + \sum_{z \in \{q, c\}} \frac{\gamma}{r_z} \quad (2)$$

where:

α, β, and γ are weighting factors
$r_n$ is the hierarchical level of a given topic
$P_n$ is the set of parent topics (superclasses) of an item.
Thus, the topics x are those distinctive superclasses of topic q that are not also superclasses of topic c, and topics y are those distinctive superclasses of topic c that are not also superclasses of topic q.

An example will aid in further understanding equation (2) and its applicability to advertisement placement according to some exemplary embodiments. Ads which are available for placement are entered into the system with any of the location keywords in the network. For this example, assume there are three ads in the system: one with the keyword "North Potomac" (r=4), one tagged with the keyword "District of Columbia" (r=2), and one with the keyword "Northwest DC" (r=3) and that each of the weighting factors in equation (2) is set at 0.33, all of which values are purely illustrative. The selection algorithm can then select the ad with the minimum hierarchical distance to the specification as follows.

Formally, given a set of advertisements $a_i \in A$ available for placement, select i to minimize HD("NorthPotomac", keyword($a_i$)). Given q=NorthPotomac, HD can be computed as follows:

1) For c=NorthPotomac, first compute the sets X:$\{P_q - P_c\}$, Y: $\{P_c - P_q\}$, Z:$\{P_q \cup P_c\}$.
$P_q$={DCMetroArea, Maryland, MontgomeryCounty, Potomac, Rockville}
$P_c$={DCMetroArea, Maryland, MontgomeryCounty, Potomac, Rockville}
X={ }
Y={ }
Z={DCMetroArea, Maryland, MontgomeryCounty, Potomac, Rockville}

$$HCD(q, c) = \sum \frac{0.33}{1} + \frac{0.33}{1} + \frac{0.33}{2} + \frac{0.33}{3} + \frac{0.33}{3}$$
$$= 1.045$$

2) For c=DistrictOfColumbia:
$P_q$={DCMetroArea, Maryland, MontgomeryCounty, Potomac, Rockville}
$P_c$={DCMetroArea}
X={Maryland, MontgomeryCounty, Potomac, Rockville}
Y={ }
Z={DCMetroArea, Maryland, MontgomeryCounty, Potomac, Rockville}

$$HCD(q, c) = \sum \left(\frac{0.33}{1} + \frac{0.33}{2} + \frac{0.33}{3} + \frac{0.33}{3}\right) + 0 +$$
$$\sum \left(\frac{0.33}{1} + \frac{0.33}{1} + \frac{0.33}{2} + \frac{0.33}{3} + \frac{0.33}{3}\right)$$
$$= 1.760$$

3) For c=NorthwestDC:
$P_q$={DCMetroArea, Maryland, MontgomeryCounty, Potomac, Rockville}
$P_c$={DCMetroArea, DistrictOfColumbia}
X={Maryland, MontgomeryCounty, Potomac, Rockville}
Y={DistrictOfColumbia}
Z={DCMetroArea, DistrictOfColumbia, Maryland, MontgomeryCounty, Potomac, Rockville}

$$HCD(q, c) = \sum \left(\frac{0.33}{1} + \frac{0.33}{2} + \frac{0.33}{3} + \frac{0.33}{3}\right) + \sum \left(\frac{0.33}{1}\right) +$$
$$\sum \left(\frac{0.33}{1} + \frac{0.33}{1} + \frac{0.33}{1} + \frac{0.33}{2} + \frac{0.33}{3} + \frac{0.33}{3}\right)$$
$$= 2.255$$

So, in this example, the selected ad would be the one tagged "North Potomac", because it is the most relevant to the specification of "North Potomac". The ad tagged "District of Columbia" is the next most relevant of the three, while the ad labeled "Northwest DC" is the least relevant, because it is more distant hierarchically from the ad specification. If some additional advertisements were added to the system, e.g., an advertisement tagged with the keyword "Montgomery County" and another advertisement tagged with the keyword "DC Metro Area", then the algorithm would correctly select both of these (HCD=1.430 and HCD=2.090, respectively) before selecting the "District of Columbia" ad.

The foregoing geographic example can be extended to other hierarchical and overlapping descriptors, such as those available for media selection interfaces as described above. For example, referring again to the exemplary user interface screen of FIG. 14, such an interface screen could be associated with the keyword "Amelie" since it provides an option for a user to select the movie "Amelie" for viewing (i.e., by selecting the corresponding DVD movie cover image). The keyword "Amelie" would be (hierarchically) below, for example, the keywords "French Films", which is in turn below "Foreign Films", as well as below "Oscar-winning Films", which has as a subordinate keyword "Winners of the Oscar for Best Foreign Film." See, for example, the illustrated hierarchy provided as FIG. 19. In this exemplary scenario, an ad 602 tagged "Amelie" would be most relevant to a movie tagged "Amelie", while an ad tagged "Best Actor Winning Films" would be significantly less relevant (though not completely irrelevant).

Path relevance uses the information gathered while moving through various screens of the GUI combined with the closed system knowledge that there are a finite number of paths between items in the algorithm for determining relevant advertisements to be displayed and can be considered to be a measure of the advertisement's click-through rate (CTR). Path relevance can be expressed algorithmically using differential clickthrough rates as:

$$\bar{r} = <r_1, r_2, \ldots, r_n> \quad (3)$$

where each element of the vector $r_i$ is the clickthrough rate for a given possible predecessor page i. One possible extension of this idea is that each element $r_i$ can itself be a vector of clickthrough rates for each of its possible predecessor pages.

Cognitive prominence divides a screen into zones with the knowledge that certain zones are known to be more frequently noticed or seen and can be considered to be a measure of "being seen" in specific zones of the screen. Cognitive prominence is modeled as a weighting factor. According to one exemplary embodiment, the screen is divided gridwise into nine zones, and each zone is assigned a weighting factor between 0 and 1. The factor for each zone is based on empirical user attention data and is independent of the content on the screen. The zone weight can then be applied to any element on the screen to account for its relative prominence to the user.

In addition to the specific metrics described above, a more general algorithm can be provided that uses all four of the criteria described above to place advertisements in a user interface. For example, such an overall algorithm selects an advertisement for presentation that a) maximizes click-through rate, b) maximizes cognitive prominence, c) maximizes topical relevance (minimizes topical distance), d) maximizes contextual relevance (minimizes hierarchical distance), and e) maximizes the cost per click (lowest CPC that is higher than the next-highest). There can also be a throttling function that applies budget and temporal distribution constraints.

The foregoing discussion of advertisement placement in or on a user interface focuses on some of the computer-implementable algorithms which can be used singly or in combination to select one or more ads for placement on a particular user interface screen. These algorithms may be implemented in many different ways. For example, the algorithm(s) may be hosted on a client-side device, e.g., a set-top box or other computing device disposed proximate to an end-user's display, e.g., a television or computer monitor and run on the corresponding hardware's processor(s). Some discussion of an exemplary client-side user interface and associated equipment is found above, although the present invention is not limited to implementation in those exemplary client-side interfaces and/or hardware elements.

Figure 20:
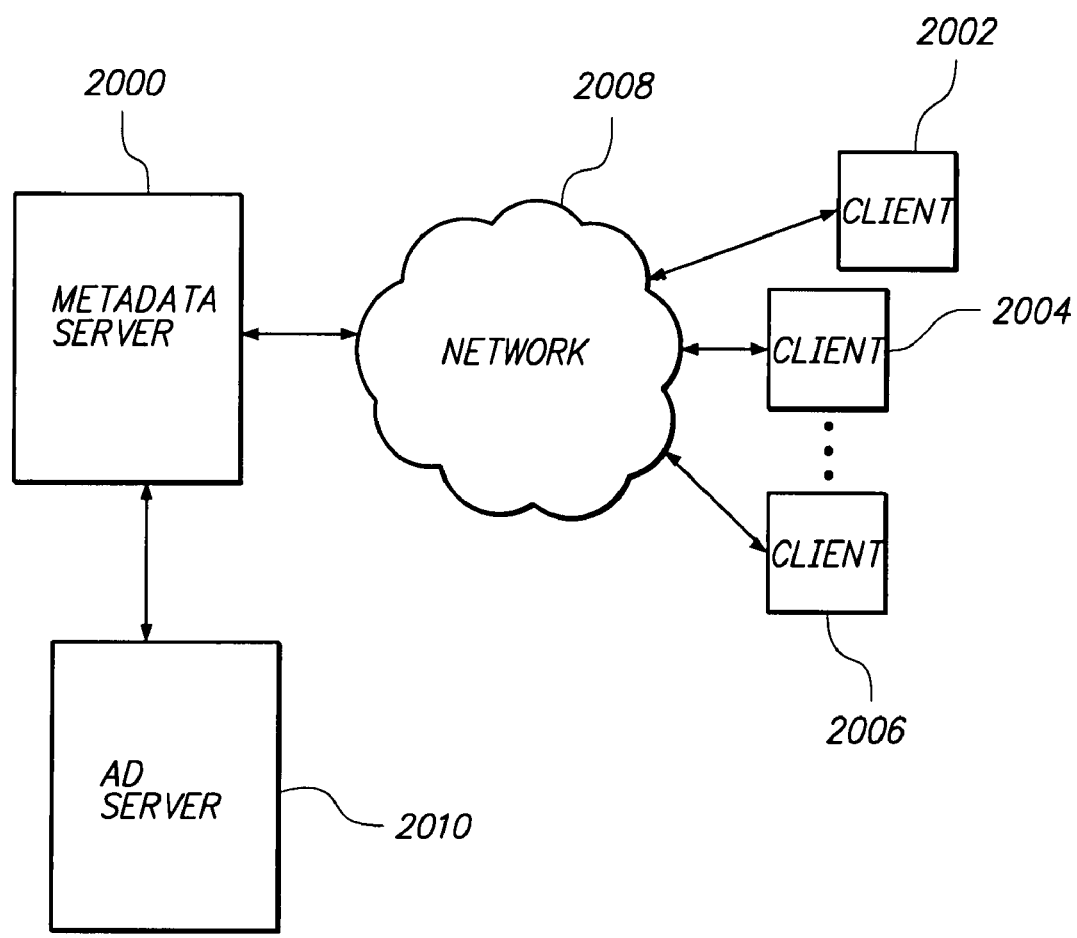
FIG. 20 shows a client-server architecture associated with placement of advertisements on user interfaces according to an exemplary embodiment.

Alternatively, these advertisement placement algorithm(s) and associated software may be hosted on the server-side. It will be appreciated that, for example, the metadata associated with the population of an exemplary media selection user interface such as that described above can be provided to multiple client-side interfaces and equipment by a metadata server, as conceptually illustrated in FIG. 20. Therein, metadata associated with, e.g., movies, is provided by metadata server 2000 to multiple clients 2002, 2004, 2006, etc., via a communication network 2008, e.g., an IP network, wireline network, wireless network, cable network, or a combination thereof, etc. For the reader interested in more detail regarding exemplary server-client architectures which can be used to support metadata and ad handling, he or she is directed to U.S. patent application Ser. No. 11/037,897, entitled "Metadata Brokering Server and Methods", filed on Jan. 18, 2005, to Bruce Israel et al., the disclosure of which is incorporated here by reference. Similarly, the advertisements to be selected and placed on user interface screens or pages can be provided by an ad server 2010, which may be separate from the metadata server 2000, as shown in FIG. 20, or combined therewith the metadata server 2000. In such an exemplary implementation, the ad selection algorithm(s) described above would then run on the processor(s) (not shown) associated with the ad server 2010 and/or metadata server 2000. As still yet another alternative, the processing of the ad selection algorithm(s) could be shared by processor(s) on both the server side and the client side.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for placing advertisements on a user interface comprising the steps of:

provinding a non-transitory computer readable medium including a zoomable user interface having a plurality of user interface screens, at least some of said plurality of graphical user interface screens containing user-selectable objects associated with media selections;

linking said user interface screens together by predetermined paths, wherein each of said plurality of user interface screens can be reached via a predetermined set of said paths;

receiving user input resulting in zooming transitions from one of said plurality of graphical user interface screens to a currently displayed another of said graphical user interface screens;

wherein a semantic context associated with reaching one of said currently displayed another of said plurality of user interface screens is determined based upon a particular path within said set of predetermined paths taken to reach said currently displayed another of said plurality of user interface screens; and placing at least one advertisement on said currently displayed another of said plurality of user interface screens based on said determined semantic context, wherein said semantic context is further determined based upon contextual relevance, said contextual relevance being calculated as:

$$HD(q, c) = \sum_{x \in \{P_q - P_c\}} \frac{\alpha}{r_x} + \sum_{y \in \{P_c - P_q\}} \frac{\beta}{r_y} + \sum_{z \in \{q,c\}} \frac{\gamma}{r_z}$$

where:
$\alpha$, $\beta$, and $\gamma$ are weighting factors,
$r_n$ is a hierarchical level of a given topic, and
$P_n$ is a set of parent topics of an item.

2. A method for placing advertisements on a user interface comprising the steps of:

providing a non-transitory computer readable medium including a user interface having a plurality of graphical user interface screens, at least some of said plurality of user interface screens containing user-selectable control objects; and determining which of a plurality of advertisements to display on a user interface screen based on at least the following criteria: topical relevance, said topical relevance being a measure of a relationship between one or more topics associated with each advertisement and one or more topics associated with said user-selectable control objects on said respective user interface screen wherein said topical relevance is calculated as:

$$\mu_T(a, p) = \sum_{i=0}^{n} \frac{\delta(a \cap t_i)}{\delta(a) + \delta(t_i)}$$

where δ is the distance of a topic point from the root node.

3. The method of claim 2, wherein said criteria includes contextual relevance and wherein said contextual relevance is a measure of a relationship between a theme of the respective user interface screen and a theme associated with each advertisement.

4. The method of claim 3, wherein said contextual relevance is calculated as:

$$HD(q, c) = \sum_{x \in \{P_q - P_c\}} \frac{\alpha}{r_x} + \sum_{y \in \{P_c - P_q\}} \frac{\beta}{r_y} + \sum_{z \in \{q,c\}} \frac{\gamma}{r_z}$$

where:
α, β, and γ are weighting factors
$r_n$ is the hierarchical level of a given topic
$P_n$ is the set of parent topics (superclasses) of an item.

5. The method of claim 2, wherein said criteria includes path relevance and wherein said path relevance uses information associated with a user's navigation path through the user interface to determine relevant ones of said plurality of advertisements.

6. The method of claim 5, wherein said path relevance is calculated as:

$$\overline{r} = \langle r_1, r_2, \ldots, r_n \rangle$$

where each element of the vector $r_i$ is the clickthrough rate for a given possible predecessor page i.

7. The method of claim 2, wherein said criteria includes cognitive prominence and where said cognitive prominence criteria divides a screen into zones relating to frequency of being seen by a user.

8. The method of claim 7, where said cognitive prominence is calculated by the steps of:
dividing a screen on which said user interface is displayed gridwise into nine zones, and
assigning each zone a weighting factor between 0 and 1.

9. The method of claim 2, wherein said step of determining further comprises the steps of:
determining one or more advertisements that maximizes clickthrough rate, maximizes cognitive prominence, maximizes topical relevance, maximizes contextual relevance, and maximizes the cost per click.

10. The method of claim 2, further comprising the step of:
displaying at least one advertisement on said user interface as a result of said determining step.

11. The method of claim 2, wherein said user interface has a plurality of different interface screens, each interface screen being individually displayable at a time; and
further wherein each interface screen can be reached through at least one predetermined path through others of said plurality of different interface screens,
wherein said step of determining which of a plurality of advertisements to display on a user interface screen based on at least one of the following criteria: topical relevance, contextual relevance, path relevance and cognitive prominence, involves using semantic context associated with a one of said at least one of said predetermined paths used to reach a currently displayed user interface screen.

12. A user interface comprising:
a non-transitory computer readable medium including a zoomable user interface having a plurality of user interface screens, at least some of said plurality of user interface screens containing user-selectable objects associated with media selections;
wherein said user interface screens are linked together by predetermined paths, wherein each of said plurality of user interface screens can be reached via a predetermined set of said paths;
an interface for receiving user input resulting in zooming transitions from one of said plurality of user interface screens to a currently displayed another of said user interface screens;
wherein a semantic context associated with reaching one of said currently displayed another of said plurality of user interface screens is determined based upon a particular path within said set of predetermined paths taken to reach said currently displayed another of said plurality of user interface screens; and
at least one advertisement placed on said currently displayed another of said plurality of user interface screens, said at least one advertisement selected based on said determined semantic context,
wherein said semantic context is further determined based upon contextual relevance, said contextual relevance being calculated as:

$$HD(q, c) = \sum_{x \in \{P_q - P_c\}} \frac{\alpha}{r_x} + \sum_{y \in \{P_c - P_q\}} \frac{\beta}{r_y} + \sum_{z \in \{q,c\}} \frac{\gamma}{r_z}$$

where:
α, β, and γ are weighting factors,
$r_n$ is a hierarchical level of a given topic, and
$P_n$ is a set of parent topics of an item.

13. An advertisement placement system comprising:
a non-transitory computer readable medium including means for providing a user interface having a plurality of graphical user interface screens, at least some of said plurality of user interface screens containing user-selectable control objects; and
said medium further including means for determining which of a plurality of advertisements to display on a user interface screen based on at least one of the following criteria: topical relevance, said topical relevance being a measure of a relationship between one or more topics associated with each advertisement and one or more topics associated with said user-selectable control objects on said respective user interface screen and being calculated as:

$$\mu_T(a, p) = \sum_{i=0}^{n} \frac{\delta(a \cap t_i)}{\delta(a) + \delta(t_i)}$$

where δ is the distance of a topic point from the root node, contextual relevance wherein said contextual relevance is a measure of a relationship between a theme of the respective user interface screen and a theme associated with each advertisement and being calculated as:

$$HD(q, c) = \sum_{x \in \{P_q - P_c\}} \frac{\alpha}{r_x} + \sum_{y \in \{P_c - P_q\}} \frac{\beta}{r_y} + \sum_{z \in \{q,c\}} \frac{\gamma}{r_z}$$

where:
- α, β, and γ are weighting factors,
- $r_n$ is a hierarchical level of a given topic, and
- $P_n$ is a set of parent topics of an item, and path relevance said path relevance using information associated with a user's navigation path through the user interface to determine relevant ones of said plurality of advertisements.

14. An advertisement selection method comprising:
providing a plurality of advertisements, each of which have at least one keyword associated therewith selected from among a plurality of keywords, wherein each of said plurality of keywords have a hierarchical level associated therewith;
providing a non-transitory computer readable medium including a plurality of user interface screens, each of which have at least one of said plurality of keywords associated therewith;
selecting at least one of said plurality of advertisements for placement on one of said plurality of user interface screens based on a calculation involving each of said at least one keywords associated, respectively, with said plurality of advertisements and said at least one of said plurality of keywords associated with said one of said plurality of user interface screens, wherein said calculation further involves at least one of the following criteria: topical relevance, said topical relevance being a measure of a relationship between one or more topics associated with each advertisement and one or more topics associated with said user-selectable control objects on said respective user interface screen and being calculated as:

$$\mu_T(a, p) = \sum_{i=0}^{n} \frac{\partial(a \cap t_i)}{\partial(a) + \delta(t_i)}$$

where δ is the distance of a topic point from the root node, contextual relevance wherein said contextual relevance is a measure of a relationship between a theme of the respective user interface screen and a theme associated with each advertisement and being calculated as:

$$HD(q, c) = \sum_{x \in \{P_q - P_c\}} \frac{\alpha}{r_x} + \sum_{y \in \{P_c - P_q\}} \frac{\beta}{r_y} + \sum_{z \in \{q,c\}} \frac{\gamma}{r_z}$$

where:
- α, β, and γ are weighting factors,
- $r_n$ is a hierarchical level of a given topic, and
- $P_n$ is a set of parent topics of an item, and, path relevance said path relevance using information associated with a user's navigation path through the user interface to determine relevant ones of said plurality of advertisements; and
- displaying said selected at least one of said plurality of advertisements on said one of said plurality of user interface screens.

* * * * *